United States Patent
Müller et al.

(10) Patent No.: US 11,610,360 B2
(45) Date of Patent: Mar. 21, 2023

(54) REAL-TIME NEURAL NETWORK RADIANCE CACHING FOR PATH TRACING

(71) Applicant: NVIDIA Corporation, Santa Clara, CA (US)

(72) Inventors: Thomas Müller, Rheinfelden (DE); Fabrice Pierre Armand Rousselle, Ostermundigen (CH); Jan Novák, Meilen (CH); Alexander Georg Keller, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 179 days.

(21) Appl. No.: 17/340,222

(22) Filed: Jun. 7, 2021

(65) Prior Publication Data
US 2022/0284657 A1 Sep. 8, 2022

Related U.S. Application Data

(60) Provisional application No. 63/155,830, filed on Mar. 3, 2021.

(51) Int. Cl.
G06T 15/06 (2011.01)
G06T 15/50 (2011.01)

(52) U.S. Cl.
CPC .......... *G06T 15/06* (2013.01); *G06T 15/506* (2013.01)

(58) Field of Classification Search
CPC ......... G06T 15/06; G06T 15/506; G06N 3/04; G06N 3/084
See application file for complete search history.

(56) References Cited

U.S. PATENT DOCUMENTS 10,909,442 B1   2/2021  Szarvas et al.
11,436,793 B1 * 9/2022  Schied .................. G06T 7/90
(Continued)

FOREIGN PATENT DOCUMENTS

CN    111583371 A    8/2020
WO    2021138842 A1  7/2021

OTHER PUBLICATIONS

Jiang, Giulio, and Bernhard Kainz. "Deep radiance caching: Convolutional autoencoders deeper in ray tracing." Computers & Graphics 94 (2021): 22-31. (Year: 2021).*
(Continued)

*Primary Examiner* — King Y Poon
*Assistant Examiner* — Vincent Peren
(74) *Attorney, Agent, or Firm* — Leydig, Voit & Mayer, Ltd.

(57) ABSTRACT

A real-time neural radiance caching technique for path-traced global illumination is implemented using a neural network for caching scattered radiance components of global illumination. The neural (network) radiance cache handles fully dynamic scenes, and makes no assumptions about the camera, lighting, geometry, and materials. In contrast with conventional caching, the data-driven approach sidesteps many difficulties of caching algorithms, such as locating, interpolating, and updating cache points. The neural radiance cache is trained via online learning during rendering. Advantages of the neural radiance cache are noise reduction and real-time performance. Importantly, the runtime overhead and memory footprint of the neural radiance cache are stable and independent of scene complexity.

35 Claims, 20 Drawing Sheets

(56) References Cited

U.S. PATENT DOCUMENTS

| | | | |
|---|---|---|---|
| 2018/0018814 A1 | 1/2018 | Dahm | |
| 2018/0218473 A1 | 8/2018 | Hoppert | |
| 2022/0239844 A1* | 7/2022 | Lv | H04N 5/262 |
| 2022/0284662 A1 | 9/2022 | Bond | |

OTHER PUBLICATIONS

Sloan, P-P., et al., "Precomputed Radiance Transfer for Real-Time Rendering in Dynamic, Low-Frequency Lighting Environments," In Proceedings of the 29th Annual Conference on Computer Graphics and Interactive Techniques (SIGGRAPH '02), Association for Computing Machinery, New York, NY 527-536.

Sousa, T., et al., "Secrets of CryENGINE 3 Graphics Technology," In Advances in Real-Time Rendering in Games: Part 1, ACM SIGGRAPH 2011 Courses.

Tabellion, E., et al., "An Approximate Global Illumination System for Computer Generated Films," In ADM SIGGRAPH 2004 Papers, Association for Computing Machinery, New York, NY 469-476.

Veach, E., et al., "Optimally Combining Sampling Techniques for Monte Carlo Rendering," In Proc. SIGGRAPH, 419-428.

Watkins, C., et al., "Technical Note Q-Learning," Machine Learning 8 (1992) 279-292.

Abadi, M., et al., "TensorFlow: Large-Scale Machine Learning on Heterogeneous Systems," http://tensorflow.org.

Abrash, M. et al., "Quake's lighting model: Surface caching," In Graphics Programming Black Book, Coriolis Group, CH 68, 1245-1256.

Anil, R., et al., "Second Order Optimization Made Practical," arXiv:2002.09018 (Feb. 2020) (Abstract).

Barre-Brisebois, C., et al., "A Certain Slant of Light: Past, Present and Future Challenges of Global Illumination in Games," In Open problems in real-time rendering, ACM SIGGRAPH 2017 Courses.

Bekaert, P., et al., "A custom designed Density Estimator for Light Transport," Technical Report, Max-Planck-Institut fur Informatik, Saarbrucken, Germany.

Benty, N., et al., "The Falcor Rendering Framework," https://github.com/NVIDIAGameWorks/Falcor.

Burley, B., et al., "The Design and Evolution of Disney's Hyperion Renderer," ACM Trans. Graph. 37, 3, Article 33 (Jul. 2018), 22 pp., https://doi.org.10.1145/3182159.

Crassin, C., et al., "Interactive Indirect Illumination Using Voxel Cone Tracing," Computer Graphics Forum 30, 7 (2011), 1921-1930.

Dachsbacher, C., "Reflective Shadow Maps," In Proceedings of the 2005 Symposium on Interactive 3D Graphics and Games (13D '05), Association for Computing Machiner, New York, NY, 203-231, https://doi.org/10.1145/1053427.1053460.

Dahm, K., et al., "Learning Light Transport the Reinforced Way," In ACM SIGGRAPH 2017 Talks (SIGGRAPH 2017), Association for Computing Machiner, New York, NY, Article 72, 2 pp., https://doi.org/101145/3084363.3085032.

Deligiannis, J., et al., "It Just Works: Ray-Traced Reflections in 'Battlefield V,'" In Game Developers Conference, Power Point presentation, 87 pp.

Ginsburg, B., et al., "Training Deep Networks with Stochastic Gradient Normalized by Layerwise Adaptive Second Moments" arXiv:1905.11286v3 (Feb. 2020).

Greger, G., et al., "The irradiance volume," IEEE Computer Graphics and Applications 18, 2 (1998), 32-43.

Gupta, V., et al., "Shampoo: Preconditioned Stochastic Tensor Optimization," arXiv:1802.09568 (Aug. 2018).

Hasselgren, J., et al., "Neural Temporal Adaptive Sampling and Denoising," Computer Graphics Forum 29, 2 (2020), 147-155.

Hermosilla, P., et al., "Deep-learning the Latent Space of Light Transport," Computer Graphics Forum 38, 4 (2019).

Hooker, J., "Volumetric Global Illumination at Treyarch," In Advances in real-time rendering, part I, ACM SIGGRAPH 2016 Courses.

Iwanicki, M., et al., "Procomputed Lighting in Call of Duty: Infinite Warfare," In Advances in Real-Time Rendering, Part I (ADM SIGGRAPH 2017 Courses), Association for Computing Machinery, New York, NY, Article 7a, 112 pp.

Izmailov, P., et al., "Averaging Weights Leads to Wider Optima and Better Generalization," arXiv:1803.05407 (Mar. 2018).

Jensen, H.W., "A Practical Guide to Global Illumination using Photon Maps," In Rendering Techniques '96 Xavier Pueyo and Peter Schroder (Eds ), Springer Vienna, Vienna, 21-30.

Kallweit, S., et al., "Deep Scattering: Rendering Atmospheric Clouds with Radiance-Predicting Neural Networks," ACM Trans Graph 36, 6, Article 231 (Nov. 2017), 11 pp.

Kaplanyan, A., et al. "Cascaded Light Propagation Volumes for Real-Time Indirect Illumination," In Proceedings of the 2010 ACM SIGGRAPH Symposium on Interactive 3D Graphics and Games (13D '10), Association for Computing Machinery, New York, NY, 99-107.

Keller, A., et al., "Integral Equations and Machine Learning," Mathematics and Computers in Simulation 161 (2019,) 2-12.

Kingma, D., et al., "Adam: A Method for Stochastic Optimization," arXiv:1412.6980 (Jun. 2014).

Krivanek, J., et al., "Practical Global Illumination with Irradiance Caching," Morgan & Claypool (Abstract).

Krivanek, J., et al., "Radiance caching for efficient global illumination computation," IEEE Transactions on Visualization and Computer Graphics 11, 5 (2005), 550-561.

Lagarde, S., et al., "Moving Frostbite to Physically Based Rendering 3.0," In ACM SIGGRAPH Course: Physically Based Shading in Theory and Practice, Chapter 10 (SIGGRAPH 2014), ACM New York, NY.

Lehtinen, J., et al., "Noise2Noise: Learning Image Restoration Without Clean Data," arXiv:cs.CV/1803.04189.

Majercik, Z., et al., "Dynamic Diffuse Global Illumination with Ray-Traced Irradiance Fields," Journal of Computer Graphics Techniques (JCGT) 8, 2 (Jun. 5, 2019), 1-30.

Martin, S., et al., "A Real-Time Radiosity Architecture for Video Games," SIGGRAPH 2010 Course: Advances in Real-Time Rendering in 3D Graphics and Games; found at: https://www.slideshare.net/DICEStudio/siggraph10-arrrealtime-radiosityarchitecture.

Mildenhall, B., et al., "NeRF: Representing Scenes As Neural Radiance Fields for View Synthesis," In ECCV.

Mittring, M., "Finging Next Gen: CryEngine 2," In ACM SIGGRAPH 2007 Courses, Association for Computing Machinery, New York, NY, 97-121.

Moreau, P., et al., "Dynamic Many-Light Sampling for Real-Time Ray Tracing," In High-Performance Graphics 2019—Short Papers, Strasbourg, France, Jul. 8-10, 2019, Markus Steinberger and Tim Foley (Eds.), Eurographics Association 21-26.

Muller, T., et al., "Neural Importance Sampling," ACM Trans. Graph. 28, 5, Article 145 (Oct. 2019), 19 pp.

Muller, T., et al., "Neural Control Variates," ACM Trans. Graph. 39, 6, Article 243 (Nov. 2020), 19 pp.

Nalbach, O., et al., "Deep Shading: Convolutional Neural Networks for Screen-Space Shading," 36, 4 (2017).

Tatarchuk, N., "Irradiance Volumes for Games," in Game Developers Conference.

Ren, P., et al., "Global Illumination with Radiance Regression Functions," ACM Trans. Graph. 32, 4, Article 130 (Jul. 2013) 12 pp.

Ritschel, T., et al., "The State of the Art in Interactive Global Illumination," Computer Graphics Forum 31, 1 (2012), 160-188.

Ritschel, T., et al., "Micro-Rendering for Scalable, Parallel Final Gathering," ACM Trans. Graph. 28, 5 (Dec. 2009), 1-8.

Ritschel, T., et al., "Approximating Dynamic Global Illumination in Image Space," In Proceedings of the 2009 Symposium on Interactive 3D Graphics and Games (13D '09), Association for Computing Machinery, New York, NY, 75-82.

Rousselle, F., et al., "Adaptive Sampling and Reconstruction Using Greedy Error Minimization," ACM Trans.Graph. 30, 6, Article 159 (Dec. 2011), 12 pp.

Seyb, D., et al., "The design and evolution of the UberBake light baking system," ACM Transactions on Graphics (Proceedings of SIGGRAPH) 39, 4 (Jul. 2020).

* cited by examiner

REAL-TIME NEURAL NETWORK RADIANCE CACHING FOR PATH TRACING

CLAIM OF PRIORITY

This application claims the benefit of U.S. Provisional Application No. 63/155,830 titled "Real-Time Neural Radiance Caching for Path Tracing," filed Mar. 3, 2021, the entire contents of which is incorporated herein by reference.

BACKGROUND

Photorealistic rendering using path tracing relies on both direct illumination and indirect illumination to generate realistic images. Path-tracing may be used to simulate global illumination and remains a challenge for real-time rendering. Indirect illumination involves multiple reflections, including contributions from lighting such as from a window or an opened door. Performing global illumination remains onerous even in offline rendering, especially when considering high-order indirect illumination. Long paths are traced from a camera, intersecting objects in a scene to accumulate radiance for each pixel of an image. Typically, the accumulated radiance is noisy due to sampling and longer paths tend to accumulate more noise. Conventionally, irradiance probes are used to reduce the noise of indirect illumination. However, irradiance probes require pre-computing and only include the diffuse component of indirect illumination. One particularly appealing approach to reduce the time needed to trace long paths is to cache radiance samples for later reuse. The contents of the cache are also pre-computed. Therefore, neither irradiance probes nor caching are suitable solutions for real-time rendering of dynamic scenes. There is a need for addressing these issues and/or other issues associated with the prior art.

SUMMARY

A real-time neural radiance caching technique for path-traced global illumination is implemented using a neural network for caching scattered radiance components of global illumination. The neural (network) radiance cache handles fully dynamic scenes, and makes no assumptions about the camera, lighting, geometry, and materials. In contrast with conventional caching, the data-driven approach sidesteps many difficulties of conventional caching algorithms, such as locating, interpolating, and updating cache points. Rather than storing pre-computed values for a scene, the neural radiance cache is trained to approximate indirect illumination for a scene via online learning during rendering.

A path is traced from a camera to an intersection position in the scene. The intersection position and view direction are input to the neural radiance cache to generate an estimation of the radiance contribution at the intersection position. The traced path is terminated into the neural radiance cache to shorten the path and reduce noise. The neural radiance cache learns quickly for real-time rendering, provides accurate estimates for sharp edges of objects and shadows, and produces accurate overall color. Advantages of the neural radiance cache are noise reduction and real-time performance. Importantly, the runtime overhead and memory footprint of the neural radiance cache are stable and independent of scene complexity.

Embodiments of the present disclosure relate to neural network radiance caching. Systems and methods are disclosed for processing, by a neural network radiance cache model, a three-dimensional (3D) position associated with a light transport path through a scene to produce a radiance (reflected light) prediction at the 3D position. An image of the scene corresponding to a camera connected to the light transport path is generated using the radiance prediction and the rendered (light transport) path is extended to generate an extended path ending at a terminal 3D position. The neural network radiance cache model processes the terminal 3D position to produce a second radiance prediction at the terminal 3D position and weights of the neural network radiance cache model are updated based on the second radiance prediction and the second radiance prediction propagated to the 3D position.

BRIEF DESCRIPTION OF THE DRAWINGS

The present systems and methods for neural network radiance caching are described in detail below with reference to the attached drawing figures, wherein.

DETAILED DESCRIPTION

Systems and methods are disclosed related to real-time neural network radiance caching for path tracing. During rendering, short paths are traced that are terminated into the neural (network) radiance cache. Inputs to the neural radiance cache include a query vertex $x_k$, that may be located on a surface or within a volume in a scene. In response to an input, the neural radiance cache generates a reflected light (radiance) prediction or approximation of the scattered radiance $L_s$ at the vertex. The approximation aggregates many samples from spatially and temporally nearby locations in the scene. A subset of the rendering light transport paths is extended by training suffixes (one or more number of additional segments/vertices) to provide training (extended) light transport paths that are used to update parameters (e.g., weights) of the neural radiance cache.

In an embodiment, a single (short) light transport path is traced for each pixel to provide rendering paths. In an embodiment, rendering paths are reused and extended to generate the training paths. In an embodiment, sparse sampling is used to generate a small number of training paths from the rendering paths (e.g., 3% of the rendering paths may be extended). In an embodiment, sparse sampling is used to select the rendering paths and the number of sparse samples remains constant as the image resolution increases. In an embodiment, radiance approximations are gathered at each intersection (vertex) along the training paths to update the neural radiance cache for each vertex along the training path (and rendering path).

Figure 1A:
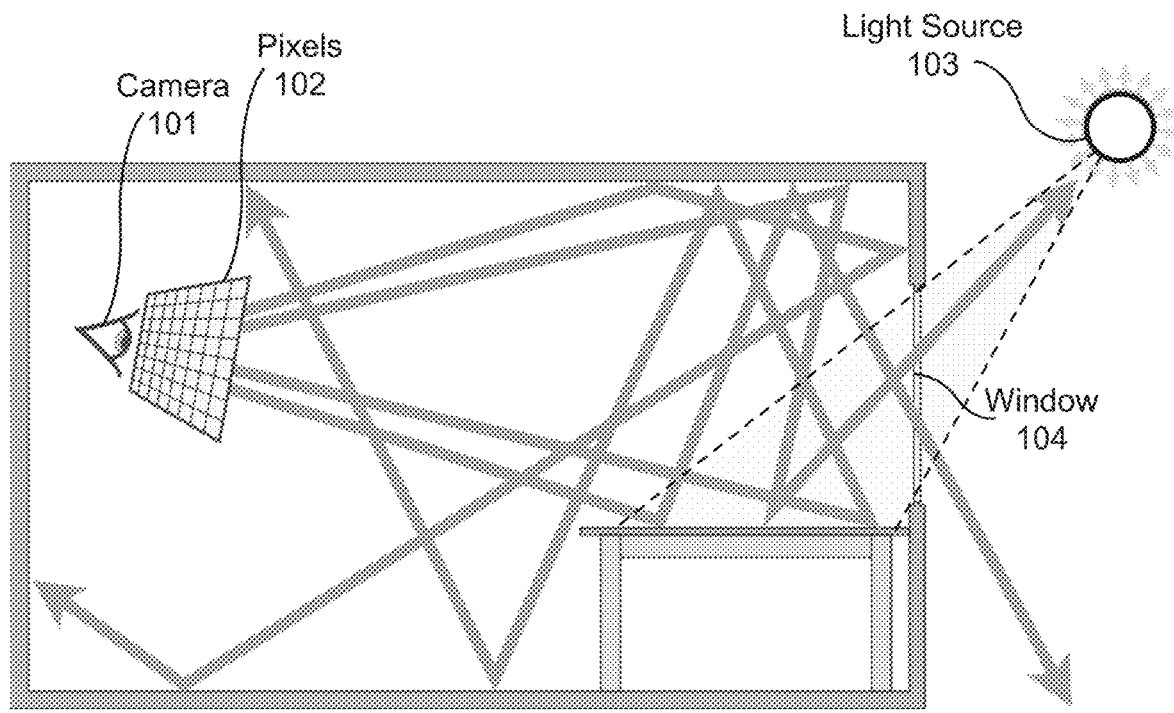
FIG. 1A illustrates paths traced through a scene in accordance with prior art.

FIG. 1A illustrates paths traced through a scene in accordance with prior art. Paths are traced from a camera 101 through pixels 102 of an image and into the scene. Direct lighting may be determined at a first intersection (bounce) of the path with a surface or light source. Indirect lighting includes contributions beyond the first intersection. Conventionally, paths are terminated at a terminal vertex when they exit the scene (e.g., out the window 104) or reach a light source 103. Each path comprises multiple segments or rays that are defined by vertices where the path intersects a surface in the scene. At each vertex, a direction for the next path segment is determined. When the path is terminated, the radiance contribution is collected and successively transported backward from the terminal vertex to any intermediate vertices along the path, ending at the first vertex in the path to provide the radiance contribution for computing a color of a pixel. Conventionally, tracing more paths improves image quality (reduces noise), but also increases cost in terms of rendering time. Tracing long paths typically cannot be performed in real-time.

Figure 1B:
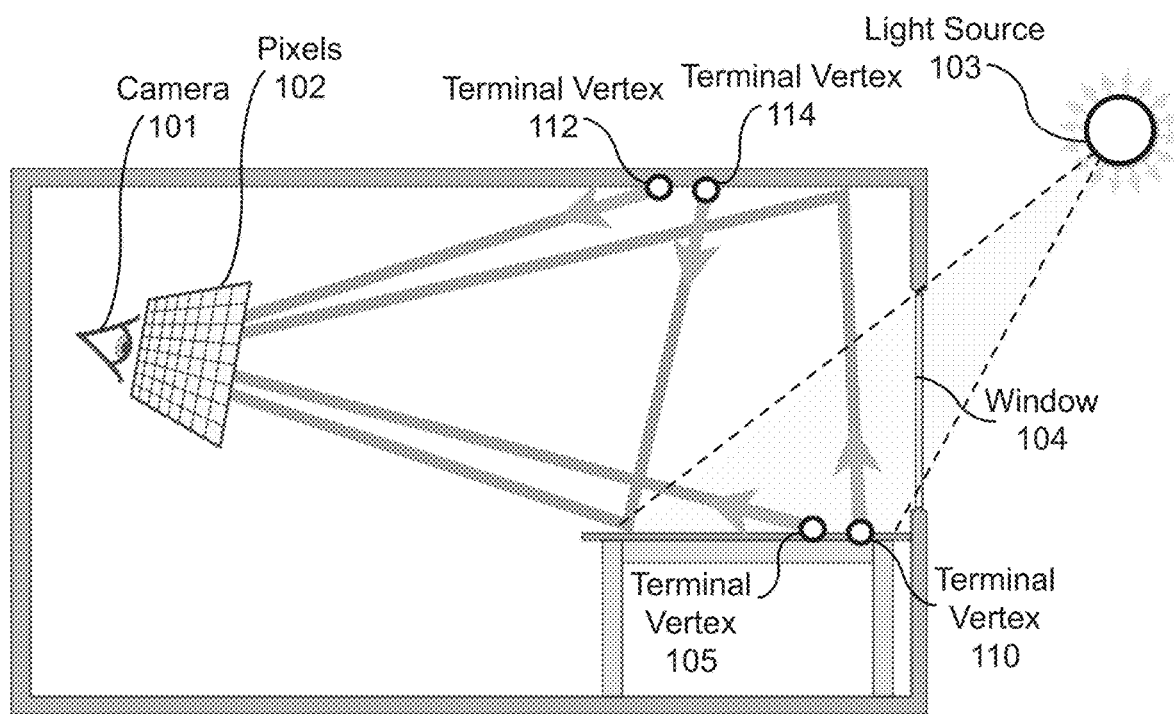
FIG. 1B illustrates paths terminated in a neural network radiance cache, in accordance with an embodiment.

FIG. 1B illustrates paths terminated in a neural network radiance cache, in accordance with an embodiment. In contrast with the long paths that are traced to perform conventional global illumination, the paths in FIG. 1B are terminated early and terminal vertices 105, 110, 112, and 114 are processed by the neural radiance cache to generate an approximation of indirect luminance, reflected light, or radiance at each terminal vertex. Terminating the paths into the neural network radiance cache saves computation and, more importantly, replaces a one-sample estimate with an approximation that aggregates many samples from spatially and temporally nearby locations. The noise is thus significantly reduced, however, the viability of caching for real-time applications is still conditioned on how efficiently and quickly the neural radiance cache can be queried and updated.

After an image is rendered using the neural radiance cache to approximate the indirect luminance, the neural radiance cache is trained before a next image is rendered. In an embodiment, rendering a single frame consists of computing pixel colors and updating the neural radiance cache. Alternating between rendering and training enables the neural radiance cache to adapt to changes in the scene, camera position, and the like.

Figure 1C:
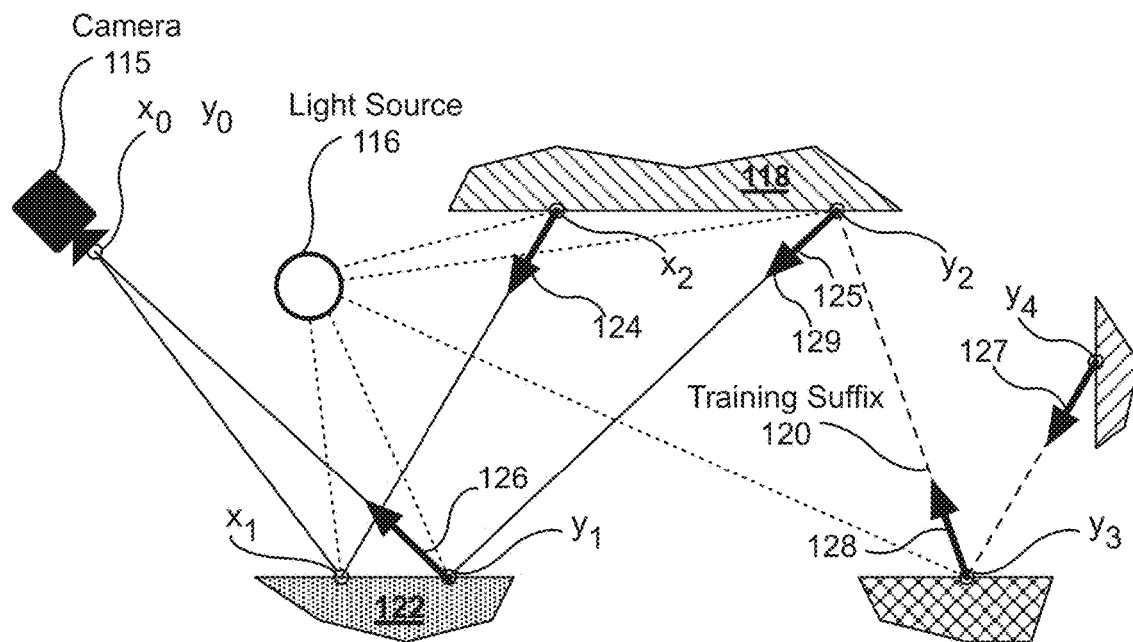
FIG. 1C is a conceptual diagram illustrating a first and second light transport path, where the second light transport path is extended to produce an extended light transport path, suitable for use in implementing some embodiments of the present disclosure.

FIG. 1C is a conceptual diagram illustrating first and second light transport paths, where the second light transport path is extended to produce a training path, suitable for use in implementing some embodiments of the present disclosure. A scene includes a light source 116 and several surfaces, including surfaces 122 and 118. In an embodiment, one rendering light transport path is traced for each pixel. The first and second light transport paths, x and y are traced through the scene starting at a camera 115 where vertices $x_0$ and $y_0$ are positioned.

As shown in FIG. 1C, the first light transport path is a short rendering path that terminates in the neural radiance cache at terminal vertex $x_2$ located on the surface 118. An intermediate vertex $x_1$ that hits the surface 122 is included between the vertex $x_2$ and a camera 115 in the short rendering path comprising two segments. The neural radiance cache is queried at the vertex $x_2$ to obtain an estimated radiance 124 or $\hat{L}_s$ at the vertex. In an embodiment, the rendering path is terminated as soon as the estimation provided by the neural radiance cache is deemed sufficiently accurate.

When the estimate is deemed sufficiently accurate, the vertex $x_2$ is identified as the terminal vertex. A heuristic may be evaluated at each vertex to determine if the estimate generated by the neural radiance cache is sufficiently accurate or if another segment is traced. In an embodiment, the heuristic indicates if a spread of the rendering path is sufficiently large to blur small inaccuracies of the neural radiance cache. Note that the estimate provided by the neural radiance cache at the vertex $x_1$ is not considered sufficiently accurate, so the rendering path is not terminated at the vertex $x_1$. Multiple importance sampling may be applied to determine a direction in which to trace segment of the short rendering paths. In an embodiment, the 3D position of the vertex and direction $\omega_k$ into the vertex are input to the neural radiance cache to generate $\hat{L}_s$.

The radiance at each vertex is collected and successively transported to intermediate vertices along the path starting from the terminal vertex and ending at the camera 115 to produce a radiance approximation for the pixel. In an embodiment, next-event estimation may be used to integrate light from emitters at each intermediate vertex.

The second light transport path is a short rendering path that terminates in the neural radiance cache at terminal vertex $y_2$ located on the surface 118. An intermediate vertex $y_1$ that hits the surface 122 is included between the vertex $y_2$ and the camera 115 in the short rendering path. The neural radiance cache is queried at the vertex $y_2$ to obtain an estimated radiance 125 at the vertex. The estimated radiance 125 provided by the neural radiance cache at the terminal vertex $y_2$ is collected and transported to the intermediate vertex $y_1$ along the short rendering path to produce a radiance approximation for the pixel. Once all of the rendering paths for an image are traced, the neural radiance cache may be optimized via training.

To optimize the neural radiance cache, a small number (typically under 3%) of the short rendering paths are extended by a few vertices called "training suffix". In an embodiment, the training suffix includes at least one additional vertex compared with the rendering path. The second light transport path y is extended from the terminal vertex $y_2$ to generate a training suffix 120 that includes two additional vertices $y_3$ and $y_4$. The combined rendering path and training suffix 120 produce a training path that is longer compared with the rendering path. The training paths may be terminated based on the same heuristic as the rendering paths by treating the terminal vertex of the rendering path as the primary vertex instead of the vertex located at the camera 115. For example, for terminating the training path at the vertex $y_4$, the terminal vertex of the rendering path ($y_2$) is used as the primary vertex.

The neural radiance cache itself is leveraged to produce target values for training. More specifically, the neural radiance cache is evaluated at the terminal vertices of the longer training paths to produce target values for training. A radiance estimate 127 at the terminal vertex of the training path is generated by the neural radiance cache and then transported to the other vertices in the training suffix 120 to produce a radiance approximation 128 at the intermediate vertex $y_3$. The radiance approximation 128 may be used as a reference value for training the neural radiance cache. Furthermore, the radiance approximation 128 is transported to the vertices $y_2$ and $y_1$, in the second light transport path, to produce additional radiance approximations 129 and 126 at vertices $y_2$ and $y_1$, respectively. The additional radiance approximations may also be used as additional reference values for training the neural radiance cache. For example, the additional radiance approximation 129 at $y_2$ may be used as a reference value compared with the radiance estimate 125 provided by the neural radiance cache at the terminal vertex $y_2$. The online training together with the termination of training paths into the neural radiance cache progressively increases the number of simulated light bounces.

As in any data-driven approach, the quality of the estimate or prediction produced by the neural radiance cache depends on the accuracy of the reference or target values $L_s$ used to train the neural radiance cache. The distinct challenge of rendering dynamic scenes in real time requires to continuously adapt the neural radiance cache according to the changing radiance field, for example, due to moving lights or geometry. Therefore, it is not possible to pre-compute precise target values $L_s$ for optimization.

Updating the neural radiance cache using its own values resembles the concept of Q-learning, described by Ken Dahm and Alexander Keller as described in "Learning Light Transport the Reinforced Way". In ACM SIGGRAPH 2017 Talks (SIGGRAPH '17) Association for Computing Machinery, New York, N.Y., USA, Article 73, 2 pages. The Q-learning approach has two distinct advantages over path-traced estimates: it trades the undesired noise for (potential) bias when estimating $L_s$. It also allows for capturing global illumination as long as the training procedure is iterated: the radiance learned by one training path is transported using multiple other training paths in the next iteration. Hence, each iteration increases the number of simulated light bounces.

However, Q-learning the neural radiance cache also has two caveats: first, the terminal vertex of the training path may reach scene locations for which the neural radiance cache has not been trained, which may incur a larger approximation error. The second drawback is that the iterated optimization may simulate only a subset of multi-bounce illumination rather than all light transport. Specifically, only the transport from emitters that can be reached by training paths will be further bounced around, and only so, if terminal vertices of training paths in subsequent frames land near the current optimization points (i.e., $y_4$ needs to be close to $y_2$ or $y_3$ in FIG. 1C). Both caveats can be alleviated almost for free by making a small fraction u of the training paths truly unbiased meaning tracing long paths, thereby injecting correct source values to be propagated by the Q-learning mechanism. In an embodiment, $u=\frac{1}{16}$, i.e., every $16^{th}$ training suffix is never terminated, except by Russian roulette.

In an embodiment, performance of the neural radiance cache is improved by providing additional attribute inputs along with the query vertex to improve the rendering quality. Additional inputs may include the view direction, material properties, surface normal vector (if the query vertex is not in a volume), and the like. For example, each of the different surfaces 118 and 122 may be a different type of material having different light scattering characteristics. In an embodiment, the query vertex and additional inputs are pre-processed before being input to the neural radiance cache.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1D:
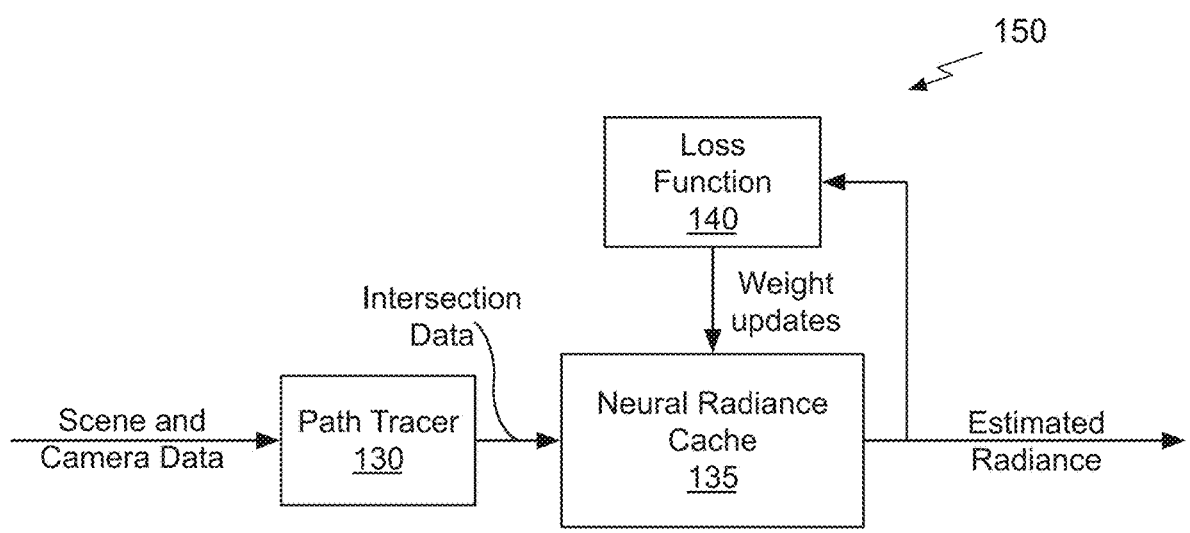
FIG. 1D is a block diagram of a neural network radiance caching system suitable for use in implementing some embodiments of the present disclosure.

FIG. 1D is a block diagram of a neural network radiance caching system 150 suitable for use in implementing some embodiments of the present disclosure. The neural network radiance caching system 150 includes a path tracer 130, a neural radiance cache 135, and a loss function 140. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the neural network radiance caching system 150 is within the scope and spirit of embodiments of the present disclosure.

During rendering, the path tracer 130 receives scene and camera data and traces short rendering paths, inputting intersection data to the neural (network) radiance cache 135 to generate a reflected light approximation. The intersection data may include one or more of a 3D position of a vertex, a direction of incidence (view direction), and attributes such as material properties, surface normal vector (if the query vertex is not in a volume), and the like. In an embodiment, the 3D position is a terminal vertex defining a first segment of the path that is a ray. In an embodiment, the 3D position is a terminal position that defines a subsequent segment of the path. The reflected light approximation is used to compute a color for a pixel of an image.

The neural radiance cache 135 estimates or predicts the scattered radiance which is the most computationally expensive component of the rendering equation. The scattered radiance $$L_s(x, \omega) := \int_{s^2} f_s(x, \omega, \omega_i) L_i(x, \omega_i) |\cos \theta_i| d\omega_i \quad (1)$$

represents the radiative energy leaving point x in direction $\omega_I$ after being scattered at x. For a given direction of incidence $\omega_I$ the integrand is the product of the bidirectional scattering distribution function (BSDF) $f_S(x, \omega, \omega_I)$, the incident radiance $L_i(x, \omega_I)$, and the foreshortening term $|\cos \theta_i|$, where $\theta_I$ is the angle between $\omega_I$ and the surface normal at x. The neural radiance cache 135 estimates $L_s$ as the cached (approximated) radiance $\hat{L}_s$. The estimated radiances corresponding to the terminal vertices of the rendering paths are backpropagated to the intermediate vertices in each path to reconstruct the image. Similarly, in an embodiment, the estimated radiances corresponding to the terminal vertices of the training paths are propagated back along each training path to produce an updated reflected light approximation for each intervening vertex between the terminal vertex and the camera.

For training or optimization, the path tracer 130 extends a subset of the short paths that were traced during rendering by at least one segment to produce training paths ending at new terminal vertices. In an embodiment, the path tracer 130 stores rendering path data for at least a portion of the rendering paths in a memory for reuse generating the training paths. In an embodiment, the pixels are organized in tiles and a single rendering path in each tile is selected for extension to produce a training path. In an embodiment, the single rendering path is selected based on a random or quasi-random offset to produce a uniform sparse set of training paths in screen space. In an embodiment, the tile size is dynamically adjusted at each frame based on the number of training paths generated during the image reconstruction. Therefore, the processing cost of training may be decoupled from the image resolution.

Processing overhead for training is reduced when the training paths are generated by extending the existing rendering paths compared with generating original training paths, as computation is shared between the two paths. In contrast, conventional caching techniques based on probe volumes, use a separate set of rays to update the cache and the separate set of rays does not contribute to the image itself. Furthermore, training the neural radiance cache 135 amounts to a regression over many samples from spatially and temporally nearby locations, i.e., a form of path-space denoising. The variance is thus significantly reduced by replacing one-sample radiance estimates with the estimates provided by the neural radiance cache 135.

In an embodiment, the estimated radiance that is generated by the neural radiance cache 135 for each terminal vertex of a rendering path and each terminal vertex of a training path is stored along with the terminal vertex. In an embodiment, the estimated radiance that is generated by the neural radiance cache 135 for each terminal vertex of a training path is stored along with the terminal vertex and the approximated radiance calculated for each intermediate vertex is also stored for use by the loss function 140 as a target to optimize the neural radiance cache 135.

The loss function 140 receives the radiance approximations for the rendering paths and updated radiance approximations for the training paths and computes updated weights $W_t$ for the neural network radiance cache 135, where t is the gradient descent step. To facilitate learning from noisy training data, the relative $\mathcal{L}^2$ loss that admits unbiased gradient estimates when the training signal—the reflected radiance $L_s(x, \omega)$ can only be estimated. In an embodiment, normalization of the loss is driven by the neural prediction:

$$\mathcal{L}^2(L_s(x, \omega), \hat{L}_s(x, \omega; W_t)) := \frac{(L_s(x, \omega) - \hat{L}_s(x, \omega; W_t))^2}{sg(\hat{L}_s(x, \omega; W_t))^2 + \epsilon}, \quad (2)$$

where $\epsilon=0.01$ and $sg(\cdot)$ denotes that its argument is treated as a constant in the optimization, i.e., that no gradient with respect to it is backpropagated. In an embodiment, for spectral values of $L_s(x, \omega)$, each color channel's loss is normalized by the squared luminance across the spectrum.

In an embodiment, the estimated radiance produced by the neural radiance cache 135 at a terminal vertex is multiplied by at least one of diffuse reflectance, specular reflectance, a normal vector, roughness, albedo, BRDF, and a phase function of a material property associated with the terminal vertex. In an embodiment, the estimated radiance is multiplied by a sum of the diffuse and specular reflectances of the material associated with the terminal vertex, $\alpha(x, \omega)+\beta(x, \omega)$, the diffuse reflectance $\alpha$, and the specular reflectance $\beta$.

When rendering dynamic content, for example changing camera position or animated geometry, the neural radiance cache 135 needs to adapt continuously. In an embodiment, a high learning-rate is used when optimizing the neural radiance cache 135 by gradient descent. In addition, multiple (e.g., 4) gradient descent steps may be performed per frame, which leads to even faster adaptation. In an embodiment, each step uses a disjoint random subset of the training data that was gathered while rendering the frame to prevent the same data from being seen twice.

However, a side effect of such an aggressive optimization schedule may be temporal artifacts like flickering and oscillations across the rendered frames—even when the scene and camera are static, because there is noise in the approximated radiance targets. In an embodiment, the updates to the neural radiance cache 135 parameters (weights) are filtered for rendering to reduce temporal artifacts (e.g., flickering and oscillations). In an embodiment, the filtering does not feed back into training and is applied only to a version of the parameters that are used for rendering.

In an embodiment, the oscillations are dampened by averaging the updated weights produced by the loss function 140 during optimization. More specifically, in an embodiment, an exponential moving average (EMA) of the network weights $W_t$ produced by the $t^{th}$ gradient descent step is computed, which creates a second set or version of weights $\overline{W}_t$ that are used by the neural radiance cache 135 for evaluating the 3D positions during rendering. The exponential moving average reads $$\overline{W}_t := \frac{1-\alpha}{\eta_t} \cdot W_t + \alpha \cdot \eta_{t-1} \cdot \overline{W}_{t-1}, \text{ where } \eta_t := 1 - \alpha^t \quad (3)$$

corrects the bias of the average for small t and $\alpha \in [0,1]$ controls the strength of exponential averaging. In an embodiment, $\alpha=0.99$ for a good trade-off between fast adaptation yet temporally stable evolution of the weights $\overline{W}_t$. In an embodiment, $\alpha=0$. In an embodiment $\alpha=0.90$. As previously described, the averaging process does not feed back into the training loop; the second set of weights $\overline{W}_t$ depends on $W_t$, but not the other way around.

Figure 1E:
FIG. 1E illustrates a reference image and an image generated using neural network radiance caching, in accordance with an embodiment.
Figure 1E:
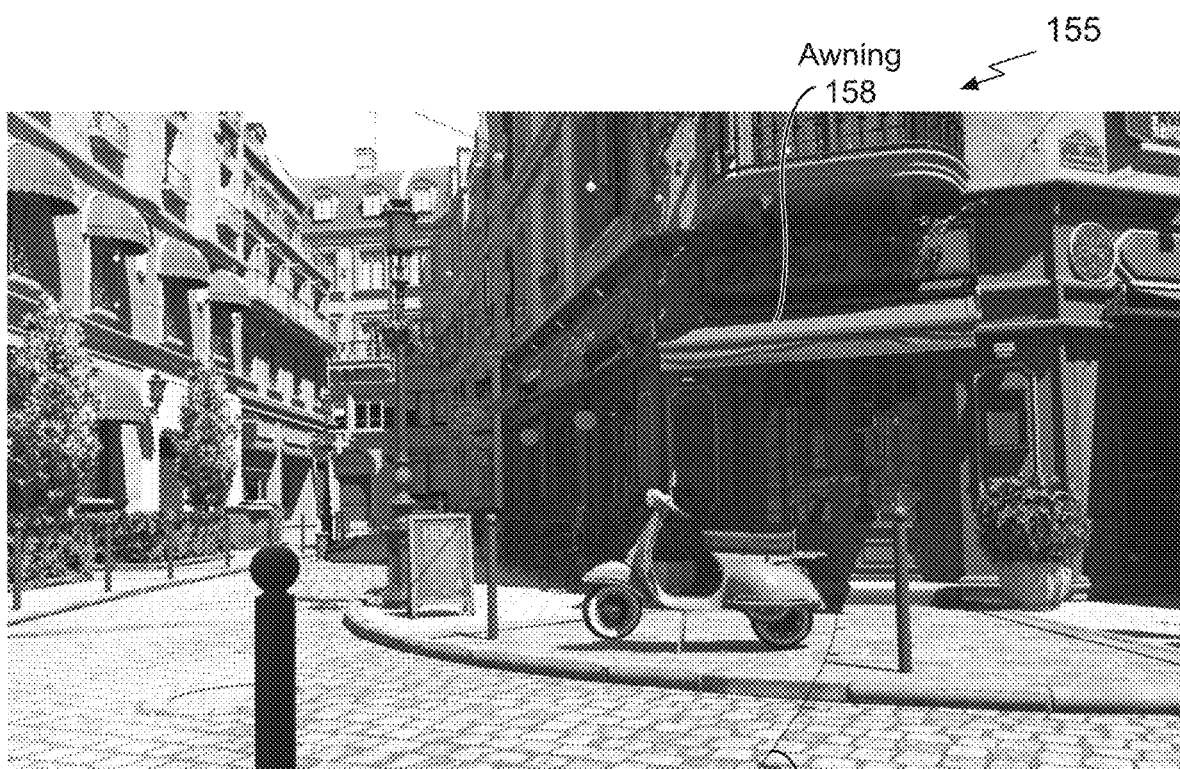

FIG. 1E illustrates a reference image 155 and an image 145 generated using neural network radiance caching, in accordance with an embodiment. Many details of the reference image 155 are accurately represented in the image 145. For example, details of a shape and edges of an awning 158, including the shadows and colors are quite accurate in the image 145. However, a shadow 156 of thin strings between the overhead lights are missing in the image 145.

The neural network radiance caching system 150 may achieve real-time frame rates on current hardware and handle a wide range of material and lighting configurations. The scene shown in FIG. 1E may be rendered with dynamic geometry, materials, and/or lighting. The neural radiance cache 135 adheres to several principles including, but not limited to enabling rendering of dynamic content, robustness, and predictable performance and resource consumption. The neural radiance cache 135 adapts to the dynamic geometry, materials, and lighting by alternating between rendering and training. The neural radiance cache 135 is also agnostic of materials and scene geometry to provide a robust solution.

Conventional neural network caches propose to train a set of local neural network caches, conditioned on the position of a single point light source. While lighting can be changed dynamically and area lighting can be approximated using a set of point lights at the cost of multiple cache queries, geometry and materials have to remain static as a consequence of the cost of the training procedure. In contrast, all lighting in the scene may be accounted for in a single query of the neural radiance cache 135 for each terminal vertex. Conventional pre-trained neural network models must generalize to novel configurations and, more challenging, content possibly never observed before. Instead, rather than relying on pre-training and generalization, the neural radiance cache 135 is capable of fast adaptation to changing and new content, pre-computation and/or pre-training is not required.

Fluctuations in rendering workload and memory usage lead to unstable and unpredictable framerates jeopardizing real-time performance. The neural radiance cache 135 provides predictable performance and resource consumption, having a stable runtime overhead and memory footprint, both of which are independent of scene complexity. In the worst case, the rendering cost scales linearly with the number of pixels being rendered. To enable generalization via adaptation in real time, multi-bounce illumination is efficiently estimated at the cost of tracing a single ray (or a very short path).

Figure 2A:
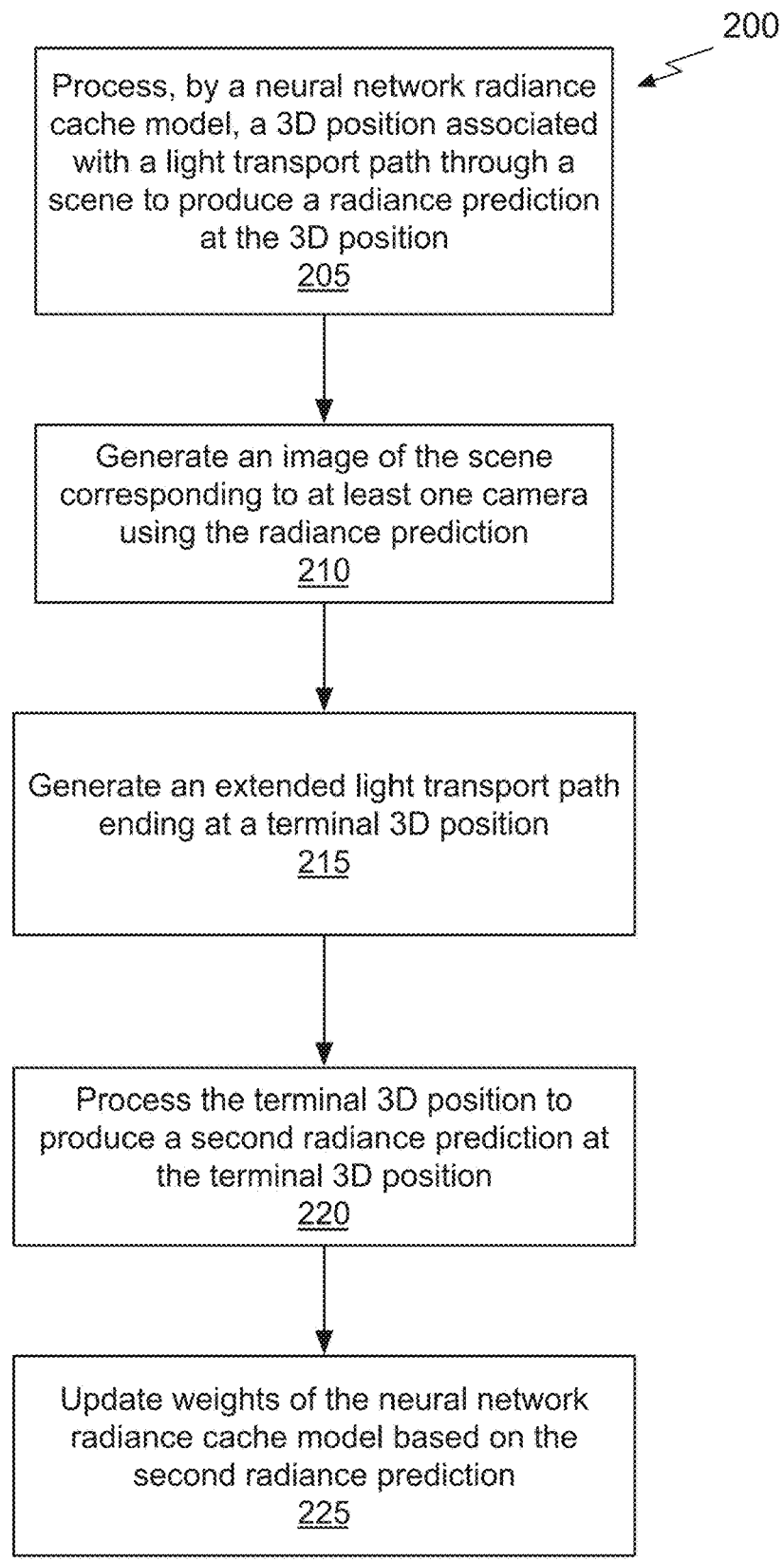
FIG. 2A illustrates a flowchart of a method for generating an image using a neural network radiance cache and training the neural network radiance cache suitable for use in implementing some embodiments of the present disclosure.

FIG. 2A illustrates a flowchart of a method 200 for generating an image using a neural network radiance cache and training the neural network radiance cache suitable for use in implementing some embodiments of the present disclosure. Each block of method 200, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 200 is described, by way of example, with respect to the neural network radiance caching system 150 of FIG. 1D. However, this method may additionally or alternatively be executed by any one system, or any combination of systems, including, but not limited to, those described herein. Furthermore, persons of ordinary skill in the art will understand that any system that performs method 200 is within the scope and spirit of embodiments of the present disclosure.

At step 205, a neural network radiance cache model processes a 3D position associated with a light transport path through a scene to produce a radiance prediction (estimated radiance or reflected light) at the 3D position. In an embodiment, the light transport path starts from a camera. In an embodiment, the light transport path starts at a position between a left and right eye. In an embodiment, the light transport path starts at an intermediate vertex of a rendering path. In an embodiment, the neural network radiance cache is the neural radiance cache 135. In an embodiment, the 3D position is a vertex. In an embodiment, a second 3D position that is associated with the rendered path and at which a second radiance prediction is computed, is importance sampled based on the 3D position. The 3D position and the second 3D position define a segment of the rendered path and a direction originating at the 3D position towards a next 3D position (e.g., the second 3D position) is chosen with probability proportional to the predicted reflected light at the second 3D position. In an embodiment, the radiance prediction comprises only ambient occlusion. In an embodiment, the neural network radiance cache model processes additional 3D positions associated with additional rendered paths from additional cameras. In an embodiment, the additional 3D positions are received via a network. In an embodiment, the 3D position is generated by at least one of a rasterizer, a ray tracer, a ray marcher, a sphere tracer, and a cone tracer.

In an embodiment, the neural network radiance cache model also processes an additional input that is at least one of a material property, view direction, or normal vector associated with the 3D position to produce the radiance prediction. In an embodiment, prior to processing the 3D position and the additional input, the 3D position and the additional input are encoded into a higher-dimensional space. In an embodiment, the 3D position is parameterized by 2D surface coordinates.

In an embodiment, the input to the neural radiance cache 135 is augmented by additional parameters that correlate with the scattered radiance: the surface normal n, the surface roughness r, the diffuse reflectance $\alpha$, and the specular reflectance $\beta$. Being able to exploit such correlations, the estimated radiance provided by the neural radiance cache 135 becomes much more accurate. It is easier for the neural radiance cache 135 to identify the correlations between the additional parameters when they are (nearly) linear. This is already the case for the diffuse and specular reflectances. However, the quantities x, ω, n, and r have a highly non-linear relation to the scattered radiance. For these quantities, a well-chosen encoding to a higher-dimensional space can make the relation more linear and thereby make the estimated radiance significantly more accurate.

The extra dimensions do not come for free, as they increase the required memory traffic as well as the cost of the first layer of the neural radiance cache 135. Therefore, in an embodiment, the quantities x, ω, n, and r are encoded using as few as possible extra dimensions while still profiting from the linearization. To this end, one-blob encoding works well when the scale of the nonlinearities is about the same order of magnitude as the size of the blobs. The one-blob encoding is described by Thomas Muller, Brian McWilliams, Fabrice Rousselle, Markus Gross, and Jan Novák in "Neural Importance Sampling" ACM Trans. Graph. 38, 5, Article 145 (October 2019), 19 pages. Encoding is a good fit for ω, n, and r as tiny variations in these parameters typically do not change the scattered radiance much. In an embodiment, ω, n, and r are encoded using a very small number (e.g. k=4) of evenly spaced blobs.

However, tiny changes in the position x can cause large variation in the scattered radiance, e.g., along shadow and geometric boundaries or in outdoor environments that are much larger than the view frustum. One-blob encoding is therefore unsuitable for robustly encoding the position with a few dimensions. Instead, a frequency encoding may be used that leverages a geometric hierarchy of periodic functions to represent a high dynamic range of values in a few encoded dimensions. A frequency encoding is described by Ben Mildenhall, Pratul P. Srinivasan, Matthew Tancik, Jonathan T. Barron, Ravi Ramamoorthi, and Ren Ng in "NeRF: Representing Scenes as Neural Radiance Fields for View Synthesis," ECCV 2020. In an embodiment, the 3D positions are represented using a frequency encoding. In an embodiment, 12 sine functions are used, each with frequency $2^d$, $d \in \{0, \ldots, 11\}$. To save on dimensions, the cosine terms of the original method may be omitted without compromising the approximation quality of the neural radiance cache 135. In summary, inputs to the neural radiance cache 135 may comprise a concatenation of the frequency-encoded position x, the one-blob encoded parameters ω, n, and r, and the diffuse and the specular reflectances, α and β as-is. In an embodiment, a resulting total number of input dimensions to the neural radiance cache 135 is 62.

At step 210, an image of the scene corresponding to at least one camera is generated using the radiance prediction. In an embodiment, the radiance prediction is multiplied by at least one of diffuse reflectance, specular reflectance, a normal vector, roughness, albedo, BRDF, and a phase function of a material property associated with the 3D position. In an embodiment, the generated image is used for training, testing, or certifying a neural network employed in a machine, robot, or autonomous vehicle.

In an embodiment, instead of or in addition to generating an image of the scene, a measurement is generated using the radiance prediction. In an embodiment, the measurement is computed by evaluating the rendering equation using the radiance prediction. In an embodiment, a measurement may be computed as a function, such as an average of a pixel footprint when creating an image. In an embodiment, a measurement is a result of a point-query (e.g., how much light arrives at position x from direction y). Measurements can be used for non-visible wavelengths of light, creating lightprobes (such as spherical images), simulating a light sensor of a robot, and the like. Measurements may also be used to produce images.

At step 215, an extended light transport path is generated ending at a terminal 3D position. In an embodiment, the extended light transport path is generated by extending the light transport path from the 3D position. In an embodiment, the terminal 3D position is not included in the light transport path. In an embodiment, the light transport path is extended by at least one additional segment to generate the extended light transport path and the extended light transport path includes at least one additional segment compared with the light transport path. In an embodiment, an extended light transport path is a separate light transport path that does not include the 3D position. In an embodiment, the updated weights are also based on the second radiance prediction propagated to the 3D position. In an embodiment, the extended light transport path is not extended from the light transport path and does not include the 3D position.

In an embodiment, the light transport path and additional light transport paths are traced to produce one light transport path for each pixel of the image, and a subset of rendering paths for which the rendering path is extended is selected from the rendering path and the additional rendering paths. In an embodiment, the subset of rendering paths is chosen according to at least one of a uniform and a non-uniform distribution.

At step 220, the neural network radiance cache model processes the terminal 3D position to produce a second radiance prediction at the terminal 3D position. In an embodiment, the terminal 3D position is processed by the neural radiance cache model 135 to produce the second radiance prediction. In an embodiment, light sources are evaluated at the terminal 3D position to produce the second radiance prediction. At step 225, weights of the neural network radiance cache model are updated based on the second radiance prediction. In an embodiment, the weights are also updated based on the second radiance prediction propagated to the 3D position. In an embodiment, a filtered copy of the weights is used to generate the radiance prediction at the 3D position. In an embodiment, the filter is a moving average over the sequence of weight updates.

In an embodiment, the neural network radiance cache model processes a second 3D position associated with a second rendered path through the scene according to the updated weights to produce a second radiance prediction at the second 3D position and a second image of the scene is generated using the radiance prediction. In an embodiment, at least one of the camera, lighting, geometry, and materials is changed for the second rendered path compared with the rendered path.

In an embodiment, the neural network radiance cache model is trained on a server or in a data center and the image is streamed to a user device. In an embodiment, one or more of the steps 205, 210, 215, 220, and 225 are performed within a cloud computing environment. In an embodiment, one or more of the steps 205, 210, 215, 220, and 225 are performed on a server or in a data center and the image is streamed to a user device. In an embodiment, one or more of the steps 205, 210, 215, 220, and 225 are performed on a virtual machine comprising a portion of a GPU.

Figure 2B:
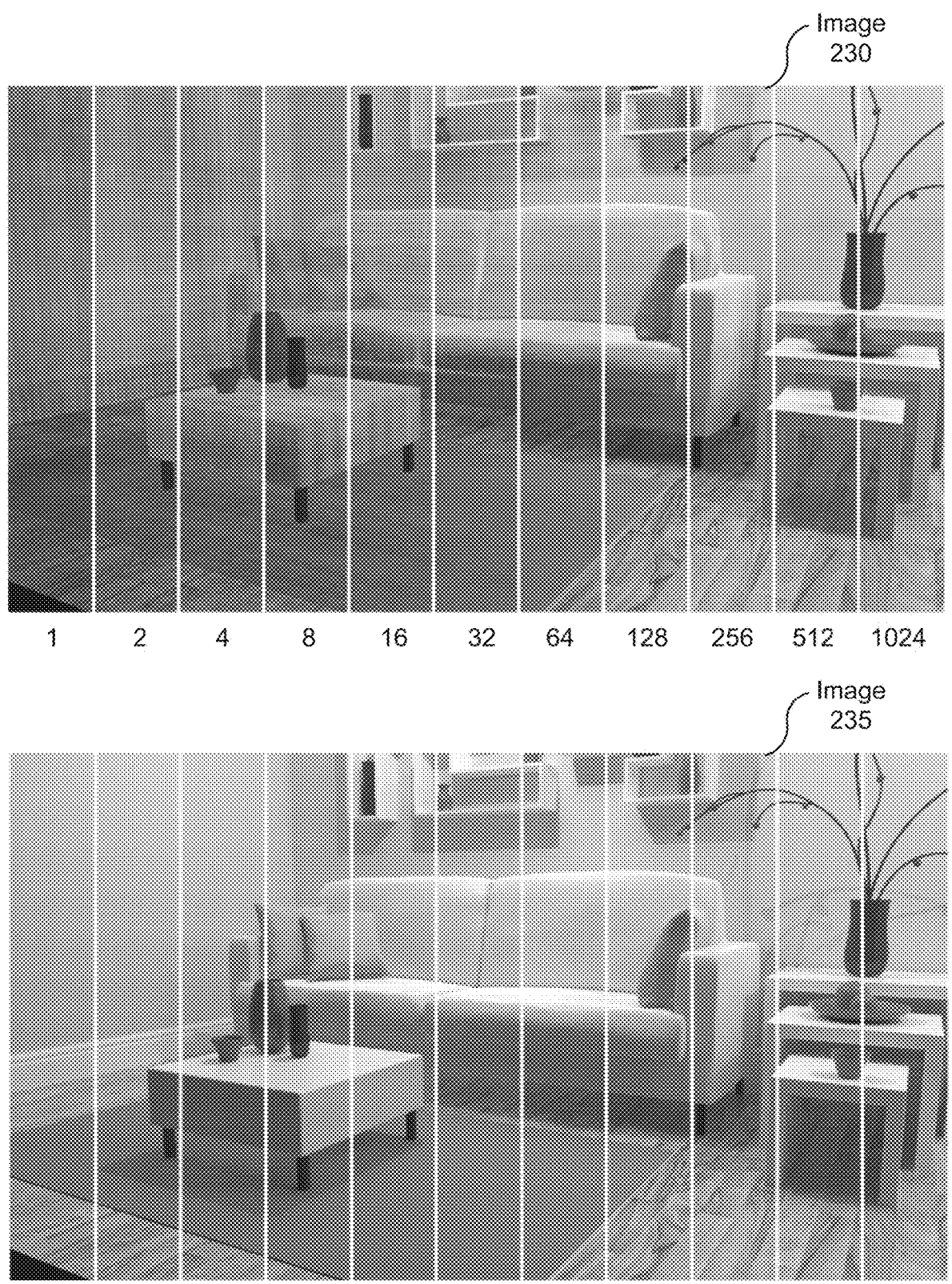
FIG. 2B illustrates portions of images generated as a number of training cycles increases, in accordance with an embodiment.

FIG. 2B illustrates portions of images 230 and 235 generated as a number of training cycles increases, in accordance with an embodiment. Both images 230 and 235 are rendered by training the neural radiance cache 135 from scratch, without performing any pre-training. A number of rendered frames and training cycles increases from one to 1024. To illustrate the training behavior, the neural radiance cache 135 is visualized directly at the first non-specular vertex for each pixel in the image 230. Using the neural radiance cache 135 at the end of short paths to render the image 235, filters the estimation error, and the cached values converge to generate satisfactory quality portions of the image 235 in as few as 8 frames (~70 ms). Already after the first 64 frames (~0.5 s) the overall colors are correct and only subtle high-frequency artifacts remain. When the neural radiance cache 135 is used to estimate radiance at terminal vertices determined based on a heuristic, the high-frequency artifacts are hidden behind path indirections and the neural radiance cache 135 may be usable after rendering only 8 frames with intervening training. Adaptation of the neural radiance cache 135 via online training is sufficiently fast for the online adaptation to animated content.

As previously described, the rendering paths may be terminated according to a heuristic based on the area-spread of path vertices. When the spread or scattering of the approximated reflected light at a vertex becomes large enough to blur away the small-scale inaccuracies of the neural radiance cache 135, the path may be terminated. Different surface materials correspond with different scattering interactions. Therefore, changing a material of an object in a scene may result in shorter or longer rendering paths. As is done for the rendering paths, the longer training paths may be truncated once the area spread of the suffix is sufficiently large. However, for the training paths, the terminal vertex of the rendering path is considered as a primary vertex.

Figure 2C:
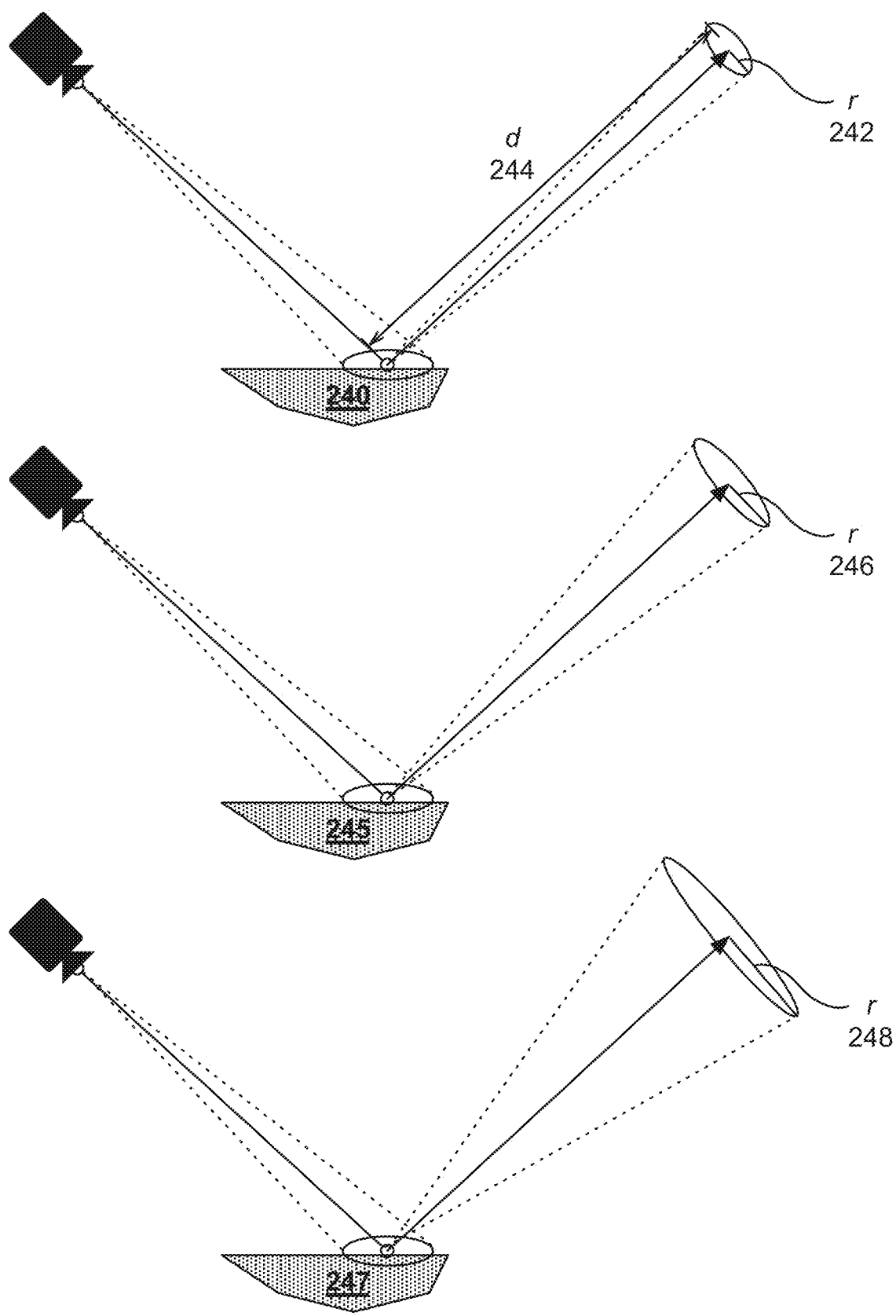
FIG. 2C illustrates path scattering interactions for different materials, in accordance with an embodiment.

FIG. 2C illustrates path scattering interactions for different materials, in accordance with an embodiment. Specular material 240, such as a mirror, produces a reflected light contribution with a low scattering interaction illustrated as a cone having a small radius r 242 for a particular length d 244 of segment or ray. Glossy material 245, such as a smooth plastic ball, produces a reflected light contribution with a medium scattering interaction having a larger radius 246. Diffuse material 247, such as woodgrain, produces a reflected light contribution with a high scattering interaction having a large radius 248.

Figure 2D:
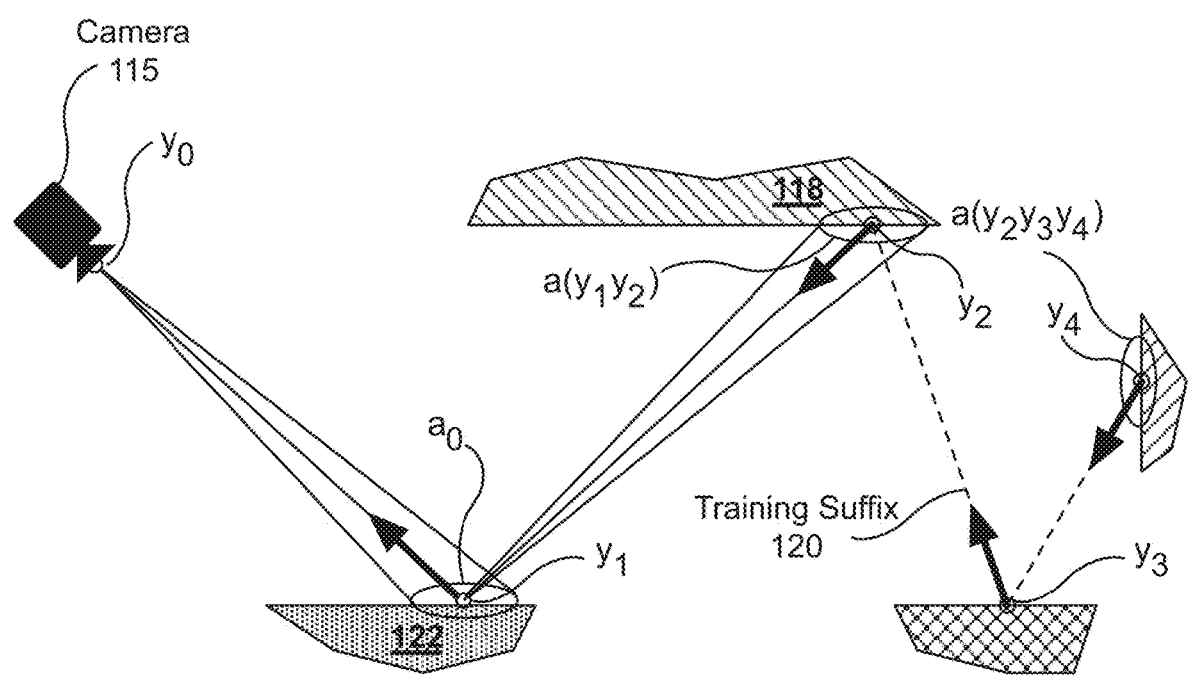
FIG. 2D illustrates path terminations according to scattering interactions, in accordance with an embodiment.

FIG. 2D illustrates path terminations according to scattering interactions, in accordance with an embodiment. A camera vertex is indexed as $y_0$ and a primary vertex is indexed as $y_1$. The path may be terminated once a spread or scattering interaction, shown as a radius of a cone base at the primary vertex, becomes large enough. For example, the size of the footprint of the path $a(y_1 y_2)$ at a terminal vertex $y_2$ of the rendering path may be compared to the size of the directly visible surface in the image plane $a_0$. The longer training paths may be terminated by the same heuristic applied to the vertices of the suffix, i.e. $a(y_2 y_3 y_4)$ is compared to $a_0$.

As described by Philippe Bekaert, et al. 2003 in "A custom designed Density Estimation Method for Light Transport," Technical Report. Max-Planck-Institut für Informatik, Saarbrücken, Germany, the area spread along the subpath $x_1 \ldots x_n$ can be cheaply approximated as the sum $$a(x_1 \ldots x_n) = \left( \sum_{i=2}^{n} \sqrt{\frac{\|x_{i-1} - x_i\|^2}{p(\omega_i \mid x_{i-1}, \omega)|\cos\theta_i|}} \right)^2, \quad (4)$$

where p is the BSDF sampling PDF and $\theta_1$ is the angle between $\omega_i$ and the surface normal at $x_i$.

To terminate a path, the subpath spread $a(x_1 \ldots x_n)$ is compared to the spread at the primary vertex as viewed from the camera (assuming a spherical image plane and ignoring constant factors):

$$a_0 := \frac{\|x_0 - x_1\|^2}{4\pi \cos\theta_1}, \quad (5)$$

that is, a path is terminated if $a(x_1 \ldots x_n) > c \cdot a_0$, where c is a hyperparameter that trades variance (longer paths) for bias and speed (shorter paths). In an embodiment, c=0.01 yields satisfactory results. Lastly, if the rendering path is selected to become a training path, the heuristic will be used once again, this time to terminate the training suffix when $a(x_n \ldots x_m) > c \cdot a_0$ is satisfied. The heuristic is illustrated in FIG. 2D where the rendering path ends at vertex n=2 and the training suffix at n=4.

Figure 2E:
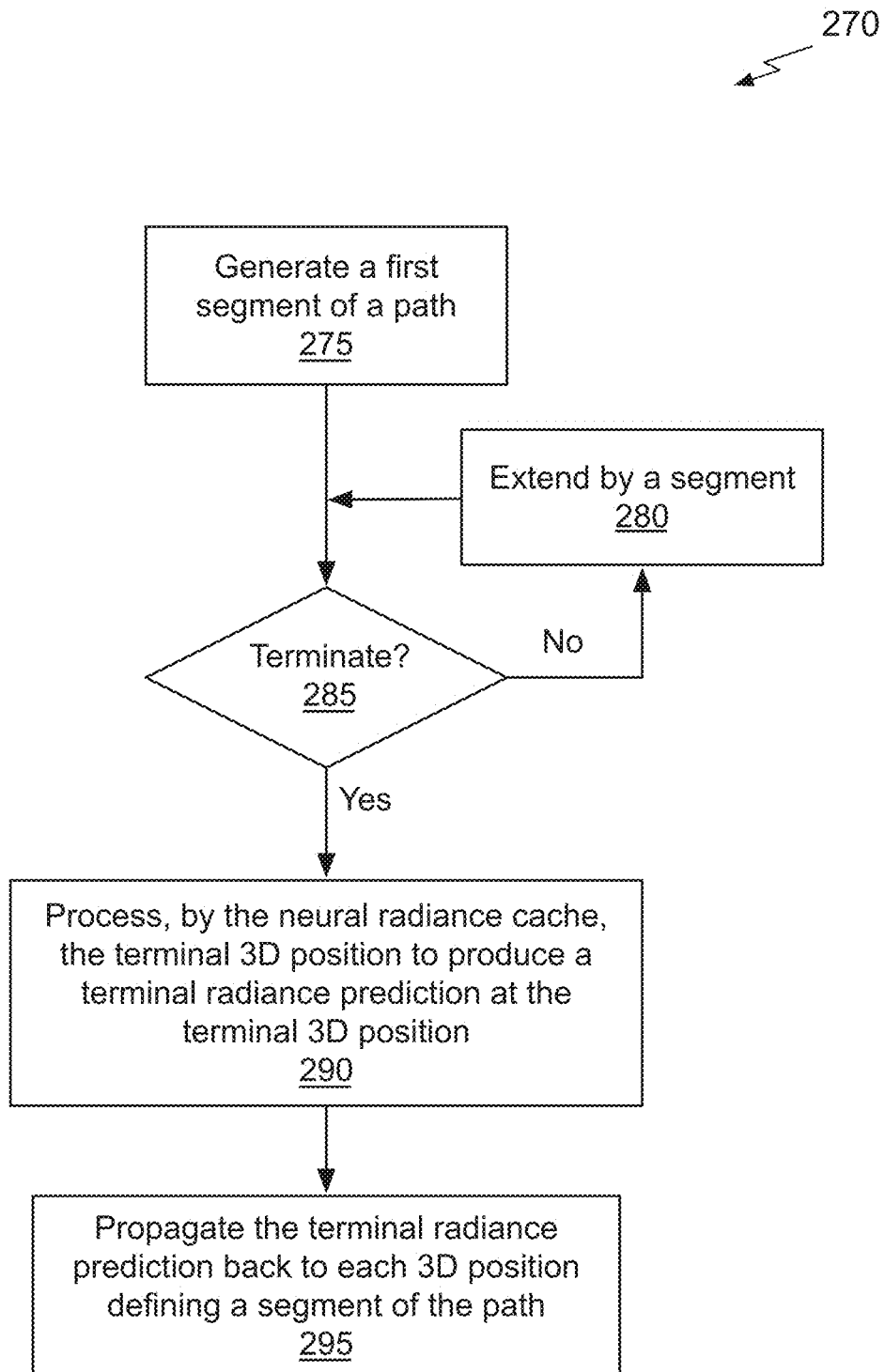
FIG. 2E illustrates a flowchart of a method for terminating a rendering or training path into a neural network radiance cache suitable for use in implementing some embodiments of the present disclosure.

FIG. 2E illustrates a flowchart of a method 270 for terminating a rendering or training path into a neural radiance cache suitable for use in implementing some embodiments of the present disclosure. Each block of method 270, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 270 is described, by way of example, with respect to the neural network radiance caching system 150 of FIG. 1D. However, this method may additionally or alternatively be executed by any one system, or any combination of systems, including, but not limited to, those described herein. Furthermore, persons of ordinary skill in the art will understand that any system that performs method 270 is within the scope and spirit of embodiments of the present disclosure.

At step 275, a first segment of a rendering (light transport) path or a training suffix of a training (light transport) path is generated. The first segment of a rendering path may be defined by a vertex (3D position) at a camera and a first vertex. The first segment of a training suffix may be defined by a terminal vertex of a rendering path and a first vertex. At step 285, a determination is made whether or not to terminate the (rendering or training) path. In an embodiment, the path may be terminated according to a heuristic based on the area-spread of path vertices. In an embodiment, the path terminates at the 3D position based on a first size of a first footprint of the path at the 3D position compared with a second size of a second footprint of the path at a visible 3D position. In an embodiment, the extended path terminates at the terminal vertex 3D position based on a third size of a third footprint of the extended path at the terminal vertex 3D position compared with the second size.

If, at step 285 the path is terminated, the first vertex is a terminal 3D position and the method 270 proceeds to step 290. Otherwise, at step 280, the path is extended by another segment before returning to step 285. At step 290, the neural radiance cache 135 processes the terminal 3D position to produce a terminal radiance prediction (estimated radiance or reflected light) at the terminal 3D position. At step 295, the terminal radiance prediction is propagated back to each 3D position defining a segment of the path.

In an embodiment, for real-time performance a rendering budget of 16.6 milliseconds is used in order to achieve a framerate of 60 frames per second. The rendering budget includes the tracing of paths, shading at every vertex, as well as querying and updating the neural radiance cache 135. In practice, the rendering budget allows just a few milliseconds to handle the neural radiance cache 135 overhead. The neural radiance cache 135 is therefore trained by extending a subset of the rendering paths to produce the training paths. Reusing the rendering paths reduces training time and relying on the neural radiance cache 135 for estimating the radiance of the training paths results in fast convergence of the weights and also enables optimizations. In contrast with conventional neural network techniques, there is no need to pre-train the neural radiance cache.

Shorter paths improve performance and shorter paths also reduce noise in the rendered images because predicted radiance has been aggregated (averaged) at the point of termination. Even though the shorter paths increase systematic error, the inaccuracies of the neural radiance cache are hidden behind fewer correctly simulated path segments. The neural network radiance caching system 150 handles fully dynamic scenes with no assumptions about camera, lighting, geometry, and materials. A streamlined neural network radiance caching system 150 architecture may be designed to maximize the quality-cost tradeoff when rendering fully dynamic scenes. To fully exploit the opportunities, a fully-fused neural network implementation of the neural radiance cache 135 is tailored to modern GPUs.

Fully-Fused Neural Networks

The neural network cache 135 may be implemented as a fully-connected neural network in a GPU programming language to take full advantage of the GPU's memory hierarchy. In the context of the following description, a fully-connected neural network configured for execution by a processor by limiting slow global memory accesses to reading and writing inputs to and outputs from the fully-connected neural network is referred to as a "fully-fused" neural network. Although the neural network cache 135 is described in the context of a GPU, the neural network cache 135 may be implemented using other processors. Performance may be dramatically improved by tailoring the implementation to specific characteristics of the processor, such as memory bandwidth, register storage capacity, parallel processing widths, and the like.

The computational cost of a fully-connected neural network scales quadratically with its width, whereas its memory traffic scales linearly. Modern GPUs have vastly larger computational throughput than they have memory bandwidth, though, meaning that for narrow neural networks, such as the neural radiance cache 135, the linear memory traffic is the bottle-neck. The key to improving performance is thus to minimize traffic to slow "global" memory (VRAM and high-level caches) and to fully utilize fast on-chip memory (low-level caches, "shared" memory, and registers).

A fully-fused approach may be used to implement the entire neural network as a single GPU kernel that is designed such that the only slow global memory accesses are reading and writing the inputs and outputs to/from the neural network. Intermediate values generated by each layer of the neural network are stored in the shared memory or registers. Furthermore, implementing the kernel from scratch as opposed to building it out of existing frameworks allows the implementation to be specifically tailored to the neural network architecture and the GPU that executes the neural network.

In an embodiment, the fully-fused neural network architecture comprises seven fully connected layers and five hidden layers that each include 64 neurons with rectified linear unit (ReLU) activation functions. An output layer reduces the 64 dimensions to three RGB values. In an embodiment, none of the layers has a bias vector, as biases did not result in any measurable quality benefit and omitting biases makes the fully-fused implementation simpler and more efficient. Note that the neural network is shallow enough for vanishing gradients not to be a problem. Hence there is no need for residual layers using skip links to assist training.

Figure 3A:
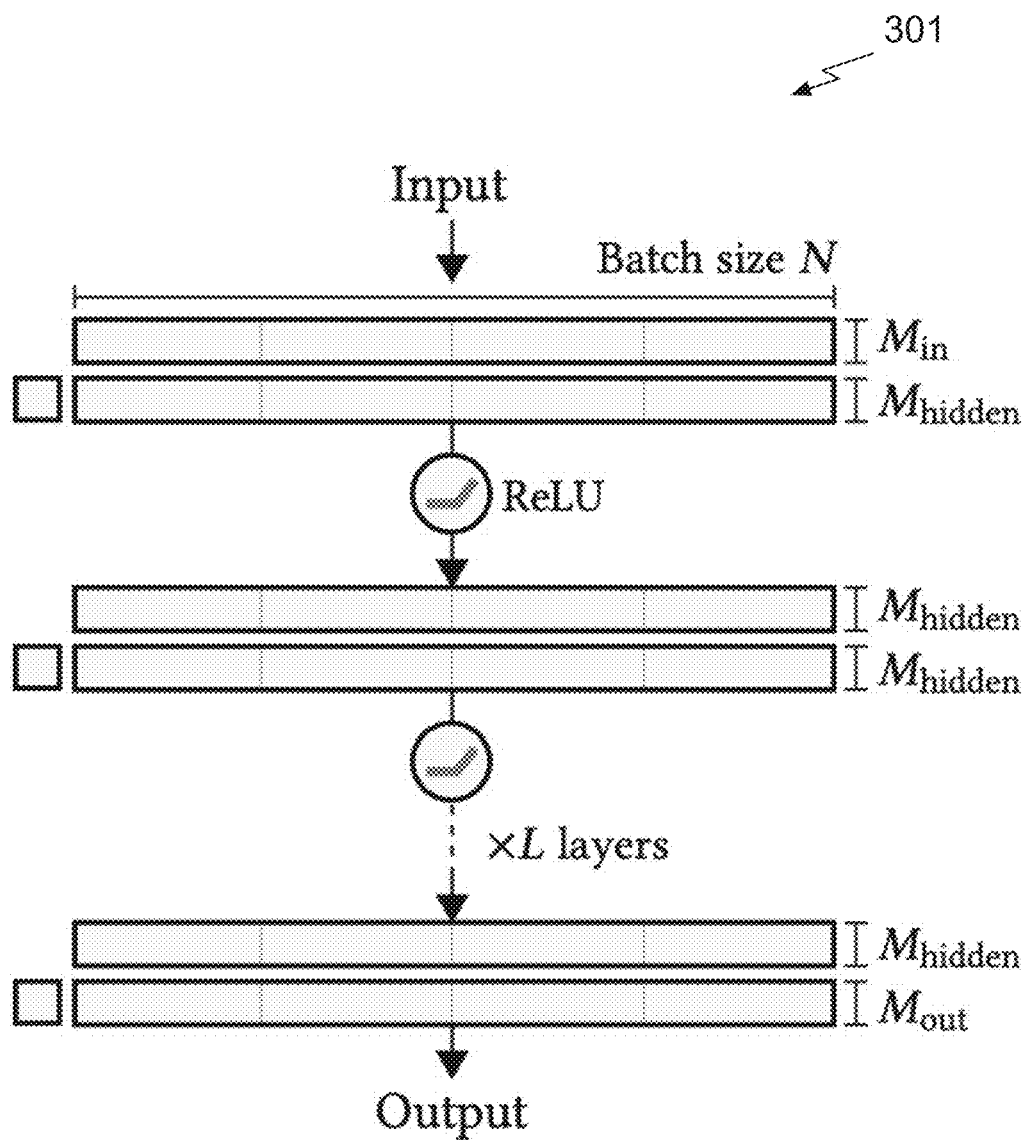
FIG. 3A is a conceptual diagram illustrating batched neural network evaluation suitable for use in implementing some embodiments of the present disclosure.

FIG. 3A is a conceptual diagram 301 illustrating batched neural network evaluation suitable for use in implementing some embodiments of the present disclosure. A multi-layer perceptron (MLP) of L fully connected layers of M neurons each is evaluated for a large batch of inputs (e.g., $N \approx 2^{21}$ for a 1920×1080 pixel frame) by performing weight-matrix multiplication and element-wise application of an activation function at each layer, except that there may be no activation function in the output layer. In an embodiment, multiple terminal vertices of rendering or training paths are included in the batch of inputs. Intermediate results (neural activations) for each layer are then processed by a ReLU. The processing workload for each batch is parallelized into chunks that are each processed by a thread block. In an embodiment, the batch is partitioned into 128 element wide chunks. If the MLP is narrow (e.g., $M_{hidden}=M_{in}=64$ neurons wide), the weight matrices fit into on-chip registers and the intermediate 64×128 neuron activations fit into on-chip shared memory. For a constant batch size, the compute cost scales with the square of the number of neurons, e.g., $O(M^2)$, and the memory traffic scales linearly with the number of neurons, e.g., $O(M)$.

Figure 3B:
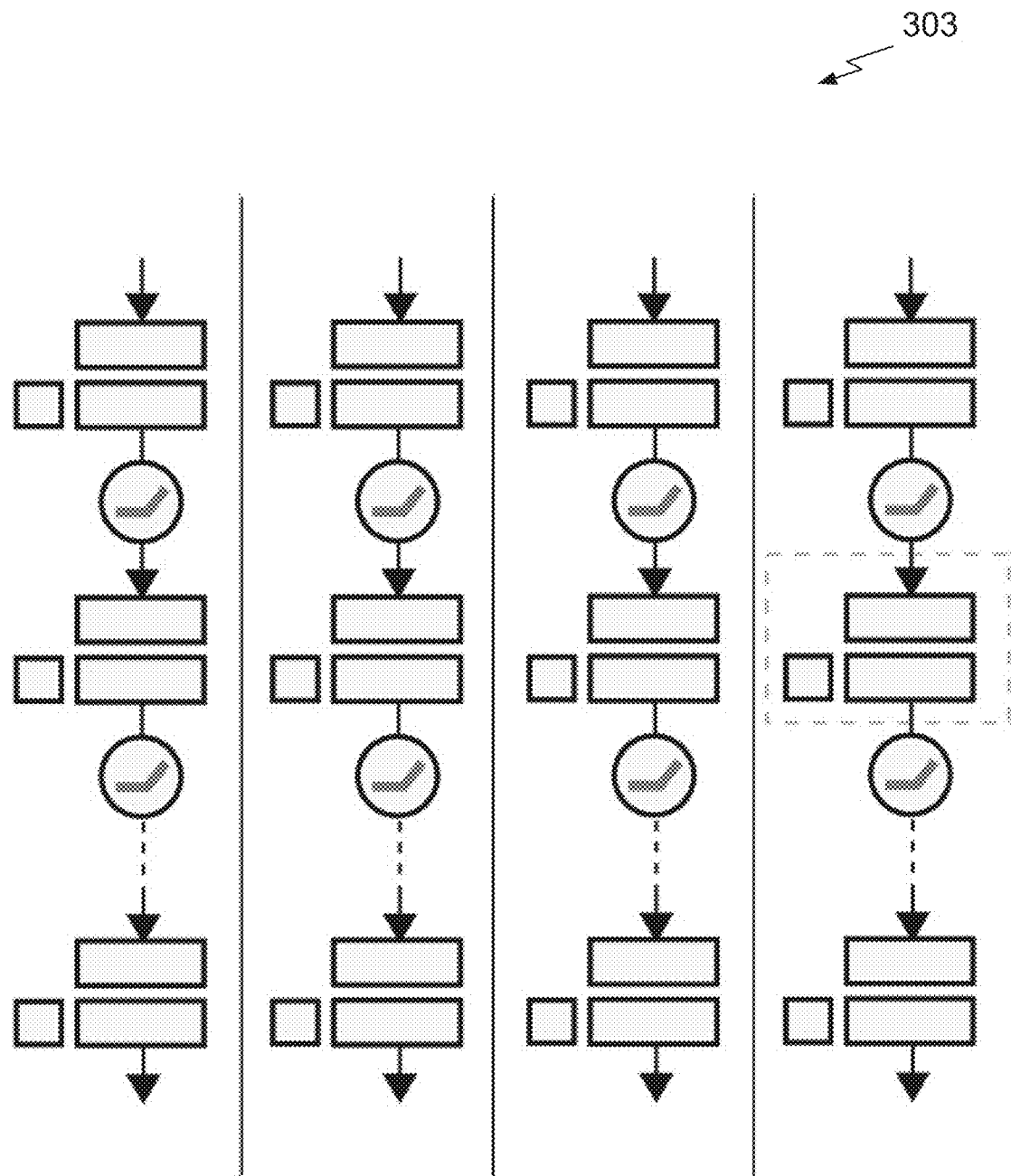
FIG. 3B illustrates distribution of a batch over thread blocks suitable for use in implementing some embodiments of the present disclosure.

FIG. 3B illustrates distribution of a batch over thread blocks 303 suitable for use in implementing some embodiments of the present disclosure. Using compute unified device architecture (CUDA) terminology: a given batch of input vectors is partitioned into block-column segments that are each processed by a single thread block. The thread blocks independently alternate between the weight-matrix multiplication and the element-wise application of the activation function. By making the thread blocks small enough such that all intermediate neuron activations fit into on-chip shared memory, traffic to slow global (off-chip) memory is minimized. This is a key advantage of the fully-fused neural network approach.

Figure 3C:
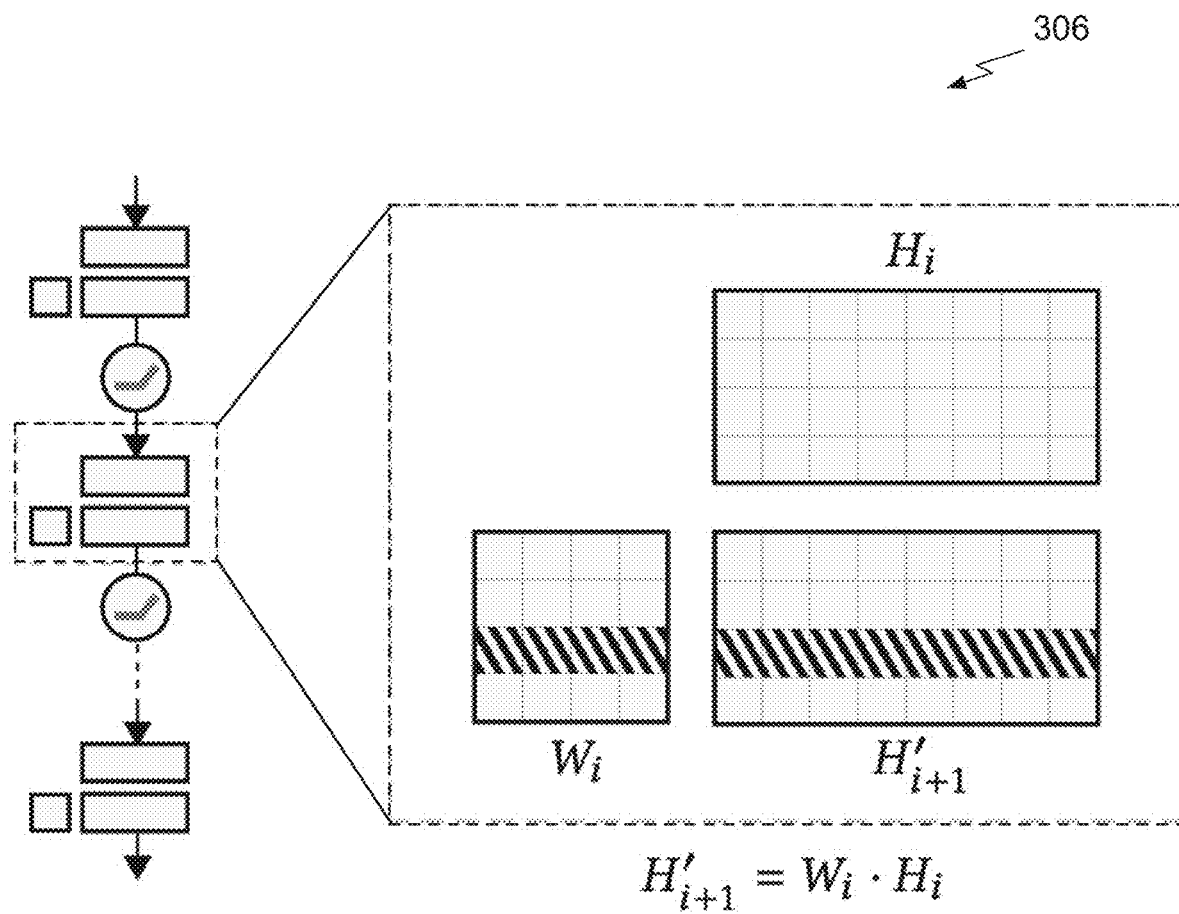
FIG. 3C illustrates per-thread-block matrix multiplication suitable for use in implementing some embodiments of the present disclosure.

FIG. 3C illustrates per-thread-block matrix multiplication 306 suitable for use in implementing some embodiments of the present disclosure. The matrix multiplication performed by each thread block transforms the i-th layer $H_i$ into the pre-activated next layer $H'_{i+1}$. The matrix multiplication is diced into blocks of 16×16 elements to match the size of a hardware-accelerated half-precision matrix multiplier. A reduction of global memory traffic may be achieved by making each thread block as large as fits into shared memory to minimize the number of thread blocks. In an embodiment, with the 64-neurons-wide neural network, a sweet-spot is met when each thread block processes 128 columns of the batch. Each thread block thus computes matrix products of a 64×64 weight matrix with a 64×128 chunk of the data.

Each warp of the thread block computes the matrix product of a single block-row (e.g., the striped area in FIG. 3C). In an embodiment, each warp of the thread block computes one 16×128 block-row of $H'_{i+1}$ by first loading the corresponding 16×64 striped weights from $W_i$ into registers and subsequently multiplying them by all 64×16 block-columns of $H_i$. Because the weights fit into the registers for the warp, the weights can be re-used for every block of $H'_{i+1}$ computed by the warp, yielding an additional performance gain. Thus, in an embodiment, each thread block loads a distinct block-row of the weight matrix from global memory exactly once, making multiple passes only over $H_i$ which is located in fast shared memory.

For training, the forward and backward passes admit the same matrix multiplication structure as during inferencing (for the short rendering paths). However, the training passes may require additional global-memory traffic, because intermediate activations and the associated gradients must be written out for backpropagation. Furthermore, additional matrix multiplications are necessary to turn the results of backpropagation into the gradients of the weight matrices.

Figure 3D:
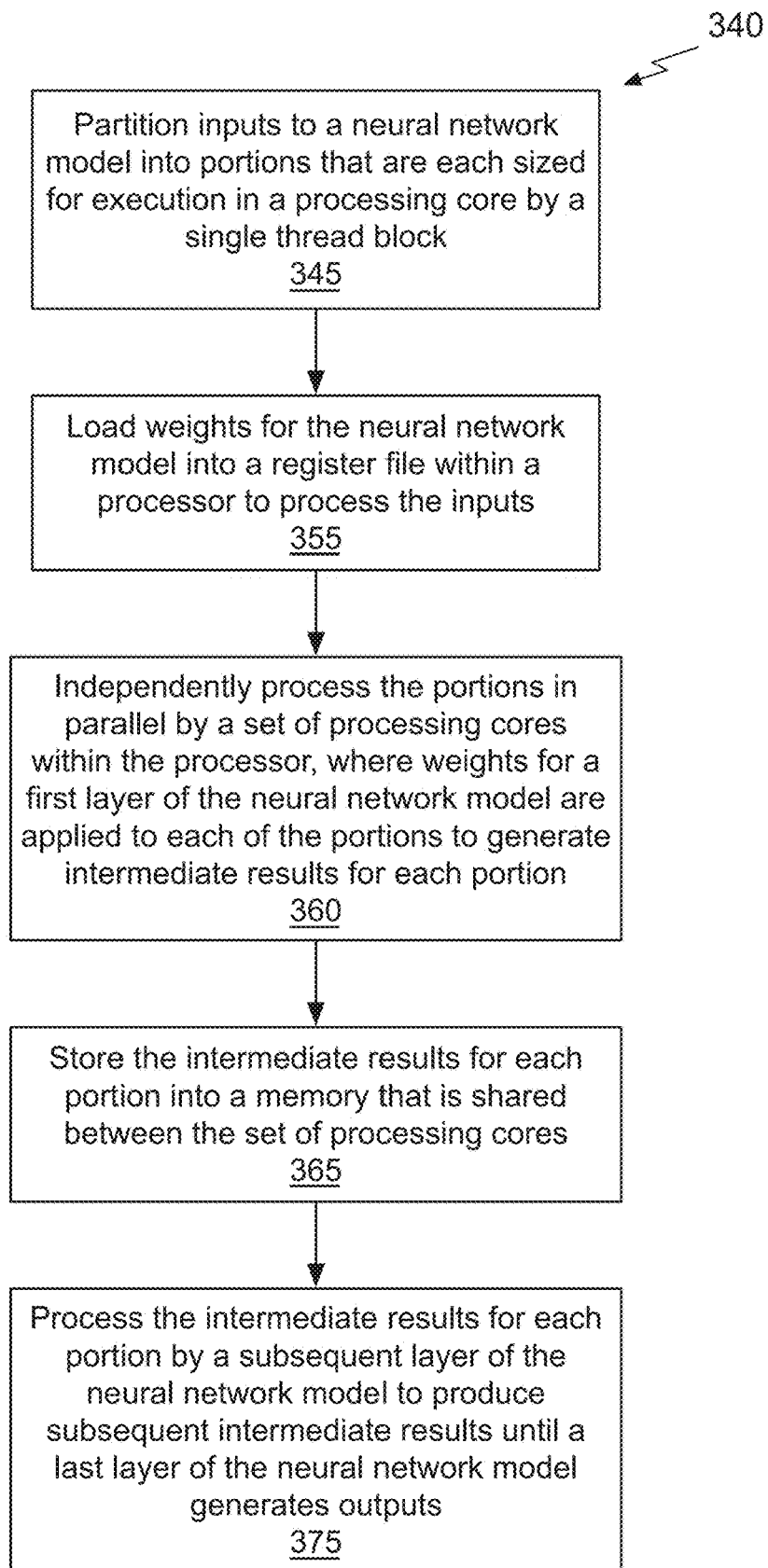
FIG. 3D illustrates a flowchart of a method for batched neural network evaluation suitable for use in implementing some embodiments of the present disclosure.

FIG. 3D illustrates a flowchart of a method 340 for batched neural network evaluation suitable for use in implementing some embodiments of the present disclosure. Each block of method 340, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 340 is described, by way of example, with respect to the neural network radiance caching system 150 of FIG. 1D. However, this method may additionally or alternatively be executed by any one system, or any combination of systems, including, but not limited to, those described herein. Furthermore, persons of ordinary skill in the art will understand that any system that performs method 340 is within the scope and spirit of embodiments of the present disclosure.

At step 345, inputs to a neural network model are partitioned into portions that are each sized for execution in a processing core by a single thread block. In an embodiment, the neural network model is the neural radiance cache 135. In an embodiment, the processing core is a processing core 442 shown in FIG. 4C.

At step 355, weights for the neural network model are loaded into a register file within a processor once to process the inputs. In an embodiment, the register file is a register file 455 shown in FIG. 4C. At step 360, a set of processing cores within the processor independently processes the portions in parallel, where weights for a first layer of the neural network model are applied to each of the portions to generate intermediate results (neural activations) for each portion.

At step 365, the intermediate results for each portion are stored into a memory that is shared between the set of processing cores. In an embodiment, the memory is a shared memory/L1 cache 465 shown in FIG. 4C. At step 375, the intermediate results for each portion are processed by a subsequent layer of the neural network model to produce subsequent intermediate results until a last layer of the neural network model generates outputs.

The method 340 may be used to implement the real-time neural radiance caching technique for path-traced global illumination. The technique is capable of robustly handling dynamic content while providing predictable performance and memory and computation resource consumption. The neural radiance cache 135 enables high rendering quality and may also achieve generalization via online adaptation. The neural radiance cache 135 may be implemented as a fully-fused neural network, employing fixed function hardware (the GPU tensor cores). In an embodiment, the neural radiance cache 135 trades off more computation, instead of costly memory accesses.

Parallel Processing Architecture

Figure 3E:
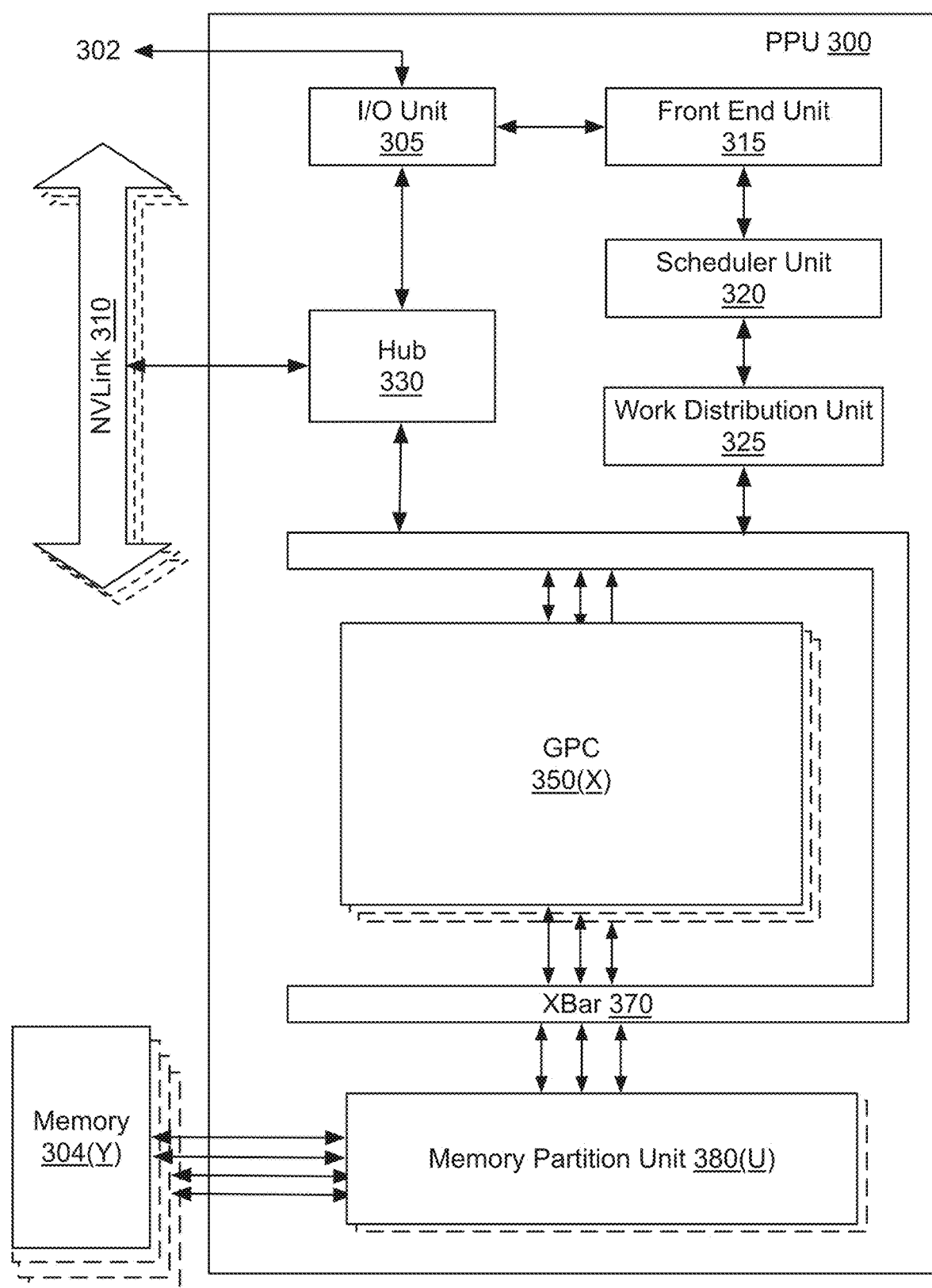
FIG. 3E illustrates an example parallel processing unit suitable for use in implementing some embodiments of the present disclosure.

FIG. 3E illustrates a parallel processing unit (PPU) 400, in accordance with an embodiment. The PPU 300 may be used to implement the neural network radiance caching system 150. In an embodiment, a processor such as the PPU 300 may be configured to implement a neural network model, such as the neural radiance cache 135. In an embodiment, the method 340 may be implemented by one or more processing cores included in the PPU 300. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, cloud computing, and machine learning applications. The PPU 300 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5A.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4C.

Figure 4A:
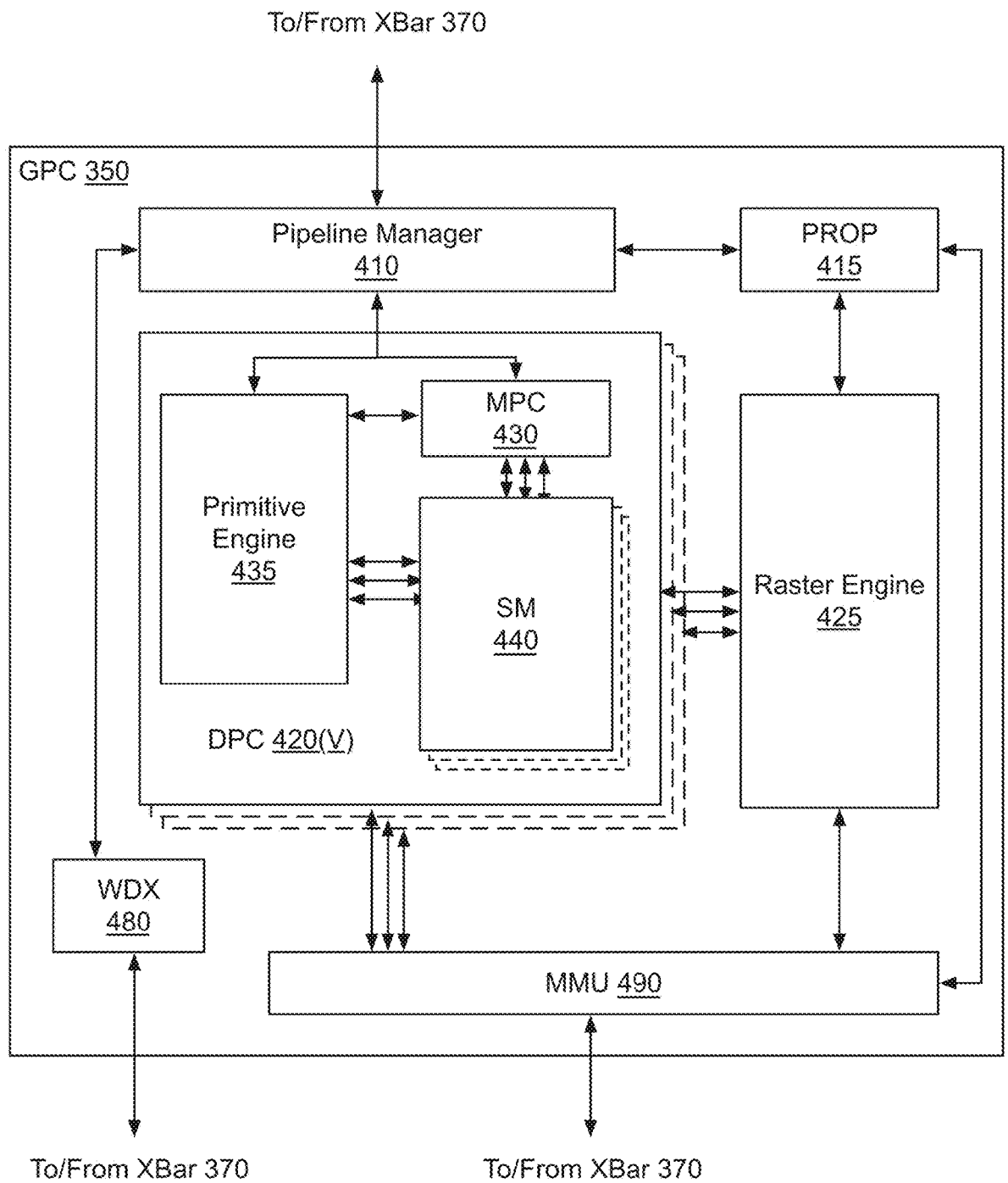
FIG. 4A illustrates an example general processing cluster within the parallel processing unit of FIG. 3E, suitable for use in implementing some embodiments of the present disclosure.

FIG. 4A illustrates a GPC 350 of the PPU 300 of FIG. 3E, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
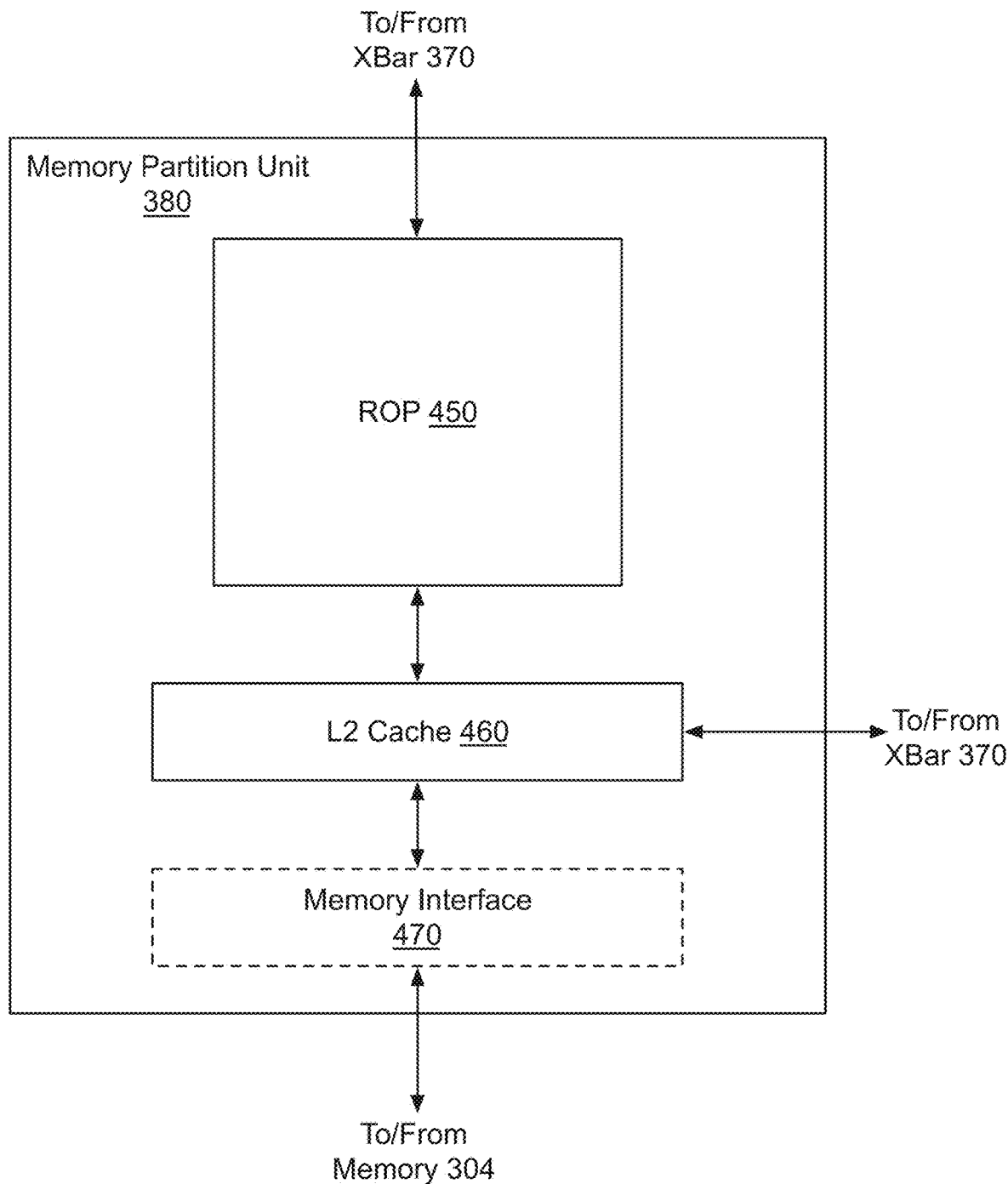
FIG. 4B illustrates an example memory partition unit of the parallel processing unit of FIG. 3E, suitable for use in implementing some embodiments of the present disclosure.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 4C.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3E, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 4C:
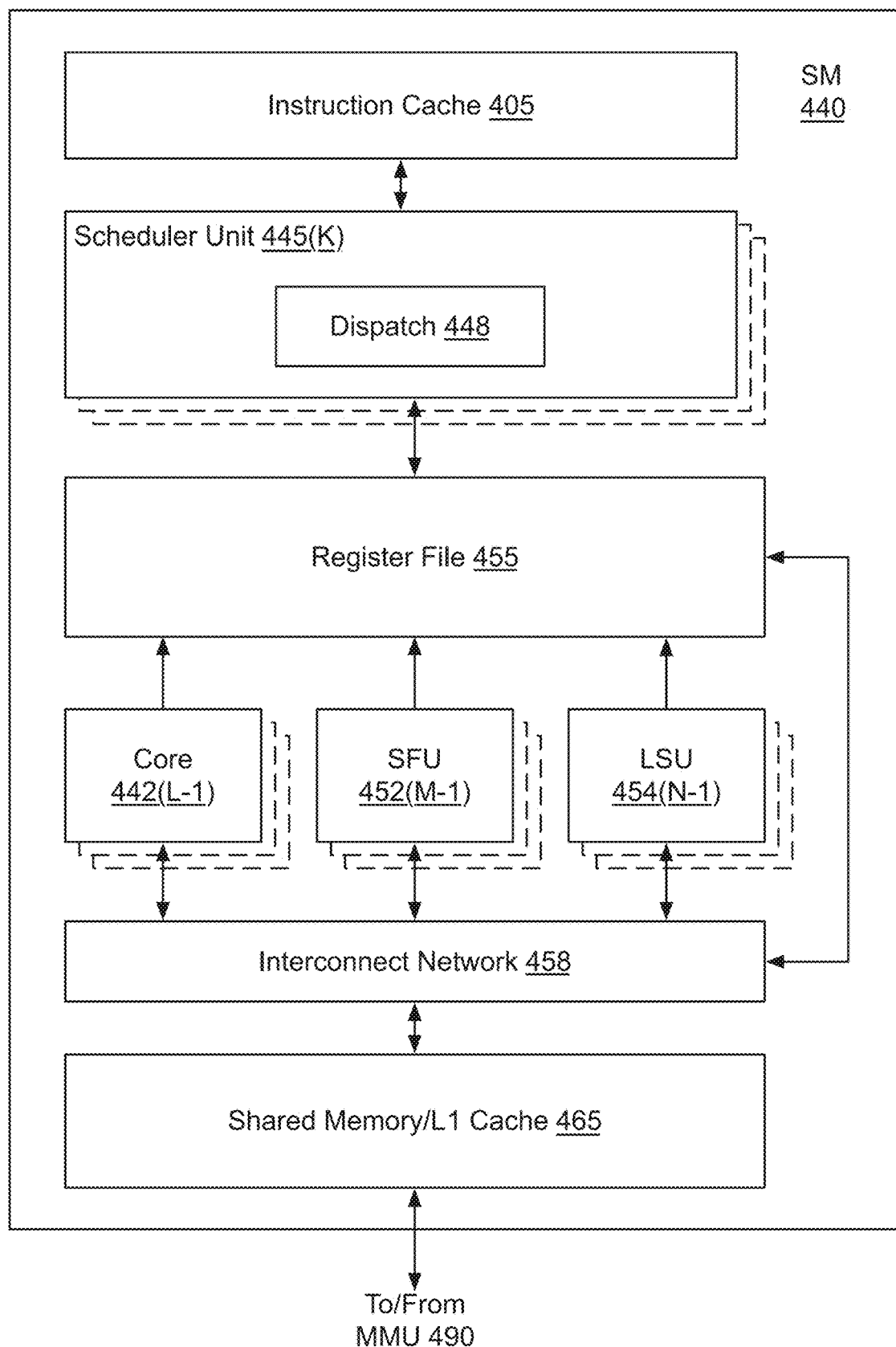
FIG. 4C illustrates an example of the streaming multi-processor of FIG. 4A, suitable for use in implementing some embodiments of the present disclosure.

FIG. 4C illustrates the streaming multi-processor 440 of FIG. 4A, in accordance with an embodiment. As shown in FIG. 4C, the SM 440 includes an instruction cache 405, one or more (K) scheduler units 445, a register file 455, one or more processing cores 442, one or more special function units (SFUs) 452, one or more load/store units (LSUs) 454, an interconnect network 458, a shared memory/L1 cache 465.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 445 receives the tasks from the work distribution unit 325 and manages instruction scheduling for one or more thread blocks assigned to the SM 440. The scheduler unit 445 schedules thread blocks for execution as warps of parallel threads, where each thread block is allocated at least one warp. In an embodiment, each warp executes 32 threads. The scheduler unit 445 may manage a plurality of different thread blocks, allocating the warps to the different thread blocks and then dispatching instructions from the plurality of different cooperative groups to the various functional units (e.g., cores 442, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 448 is configured to transmit instructions to one or more of the functional units. In the embodiment, the scheduler unit 445 includes two dispatch units 448 that enable two different instructions from the same warp to be dispatched during each clock cycle. In alternative embodiments, each scheduler unit 445 may include a single dispatch unit 448 or additional dispatch units 448.

Each SM 440 includes a register file 455 that provides a set of registers for the functional units of the SM 440. In an embodiment, the register file 455 is divided between each of the functional units such that each functional unit is allocated a dedicated portion of the register file 455. In another embodiment, the register file 455 is divided between the different warps being executed by the SM 440. The register file 455 provides temporary storage for operands connected to the data paths of the functional units.

Each SM 440 comprises L processing cores 442. In an embodiment, the SM 440 includes a large number (e.g., 128, etc.) of distinct processing cores 442. Each core 442 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 442 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 442. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A \times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 465. The texture units implement texture operations such as filtering operations using mip-maps (e.g., texture maps of varying levels of detail). In an embodiment, each SM 340 includes two texture units.

Each SM 440 also comprises N LSUs 454 that implement load and store operations between the shared memory/L1 cache 465 and the register file 455. Each SM 440 includes an interconnect network 458 that connects each of the functional units to the register file 455 and the shared memory/L1 cache 465. In an embodiment, the interconnect network 458 is a crossbar that can be configured to connect any of the functional units to any of the registers in the register file 455 and memory locations in shared memory/L1 cache 465.

The shared memory/L1 cache 465 is an array of on-chip memory that allows for data storage and communication between the SM 440 and the primitive engine 435 and between threads in the SM 440. In an embodiment, the shared memory/L1 cache 465 comprises 128 KB of storage capacity and is in the path from the SM 440 to the memory partition unit 380. The shared memory/L1 cache 465 can be used to cache reads and writes. One or more of the shared memory/L1 cache 465, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 465 enables the shared memory/L1 cache 465 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3E, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 465 to communicate between threads, and the LSU 454 to read and write global memory through the shared memory/L1 cache 465 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
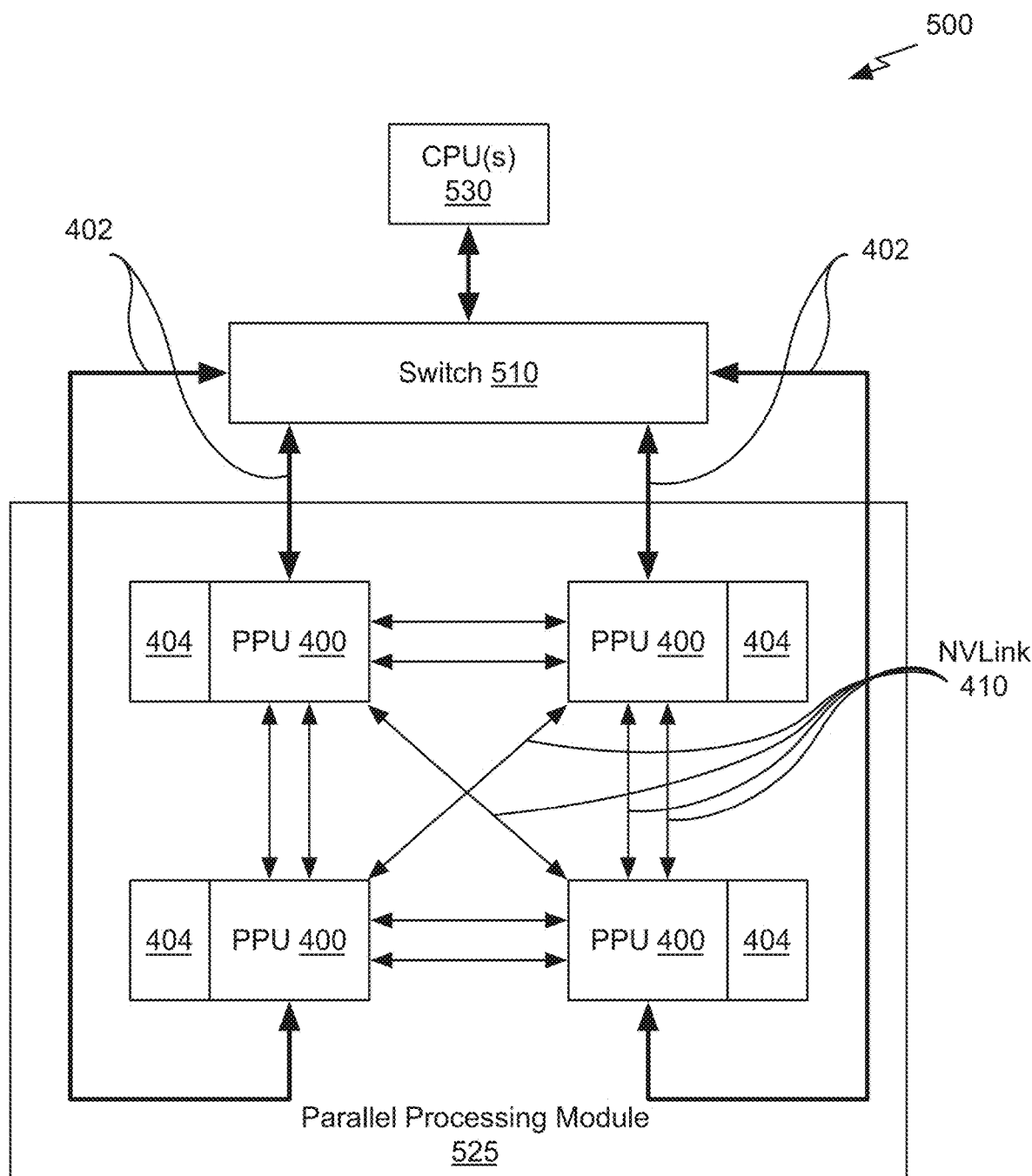
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the methods 200, 270, and/or 350 shown in FIGS. 2A, 2E, and 3D, respectively. The processing system 500 includes a CPU 530, switch 510, and multiple PPUs 400, and respective memories 404.

Figure 5B:
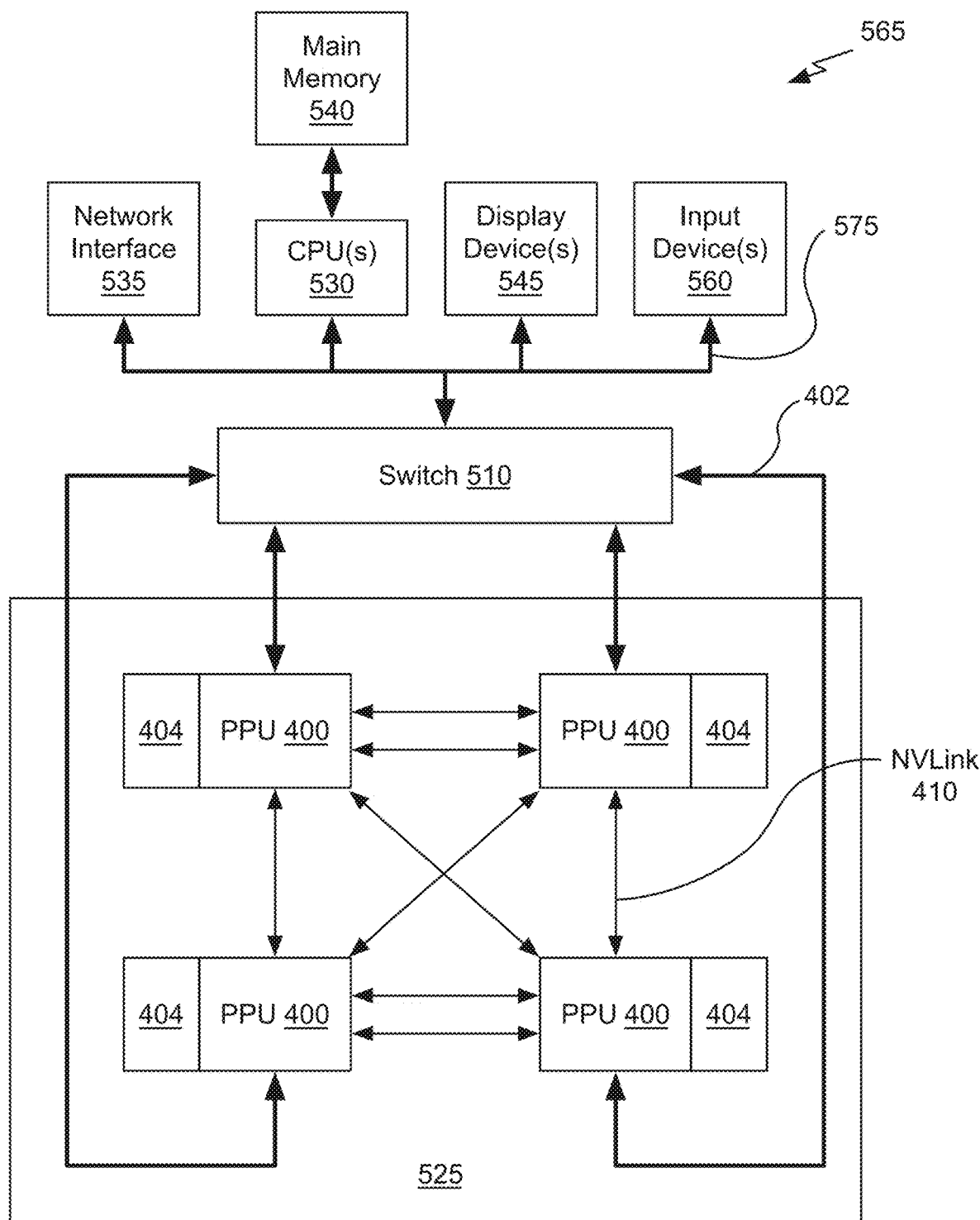
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the methods 200, 270, and/or 350 shown in FIGS. 2A, 2E, and 3D, respectively.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
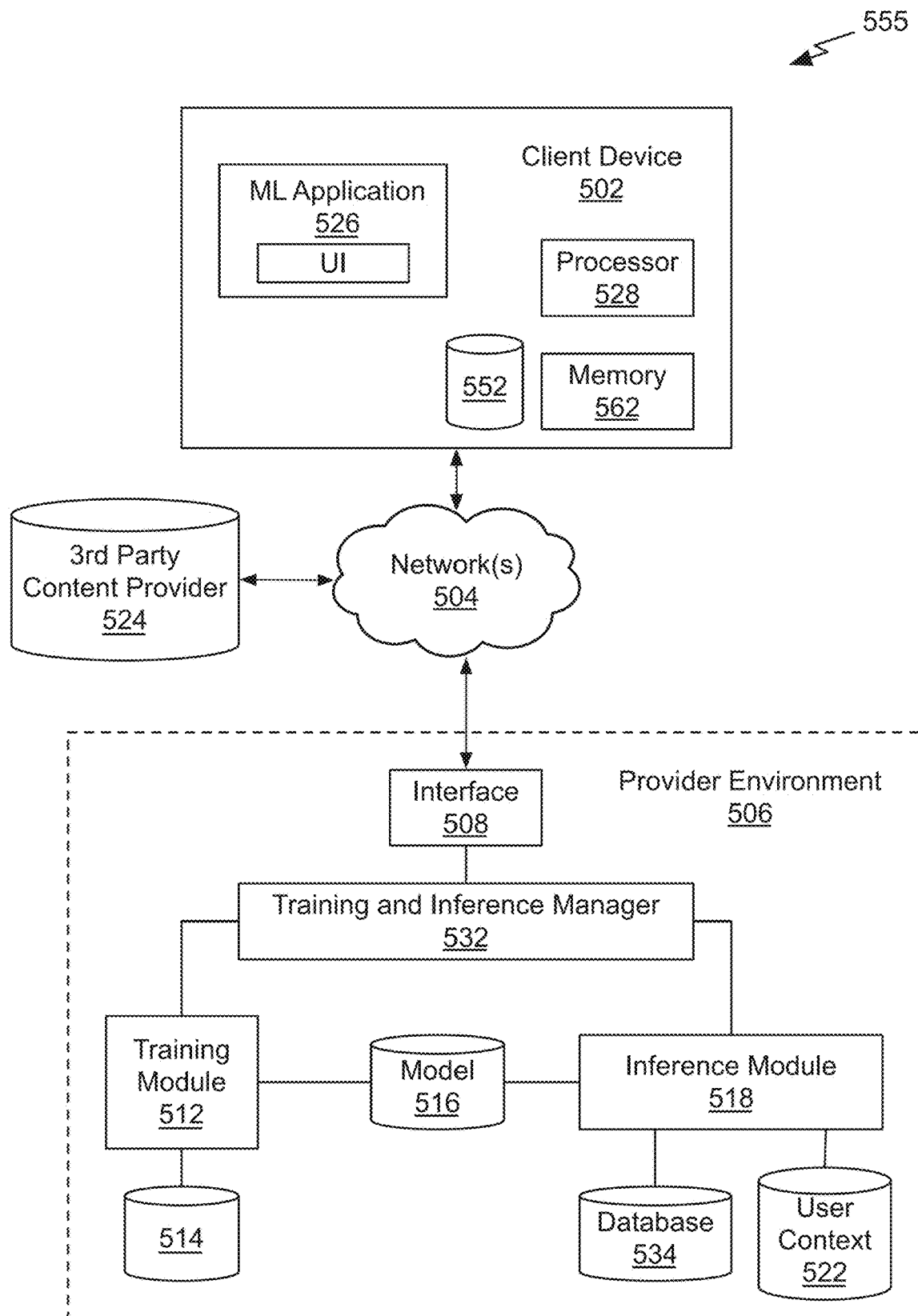
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used to train one or more neural networks within the control variate neural network system 100.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
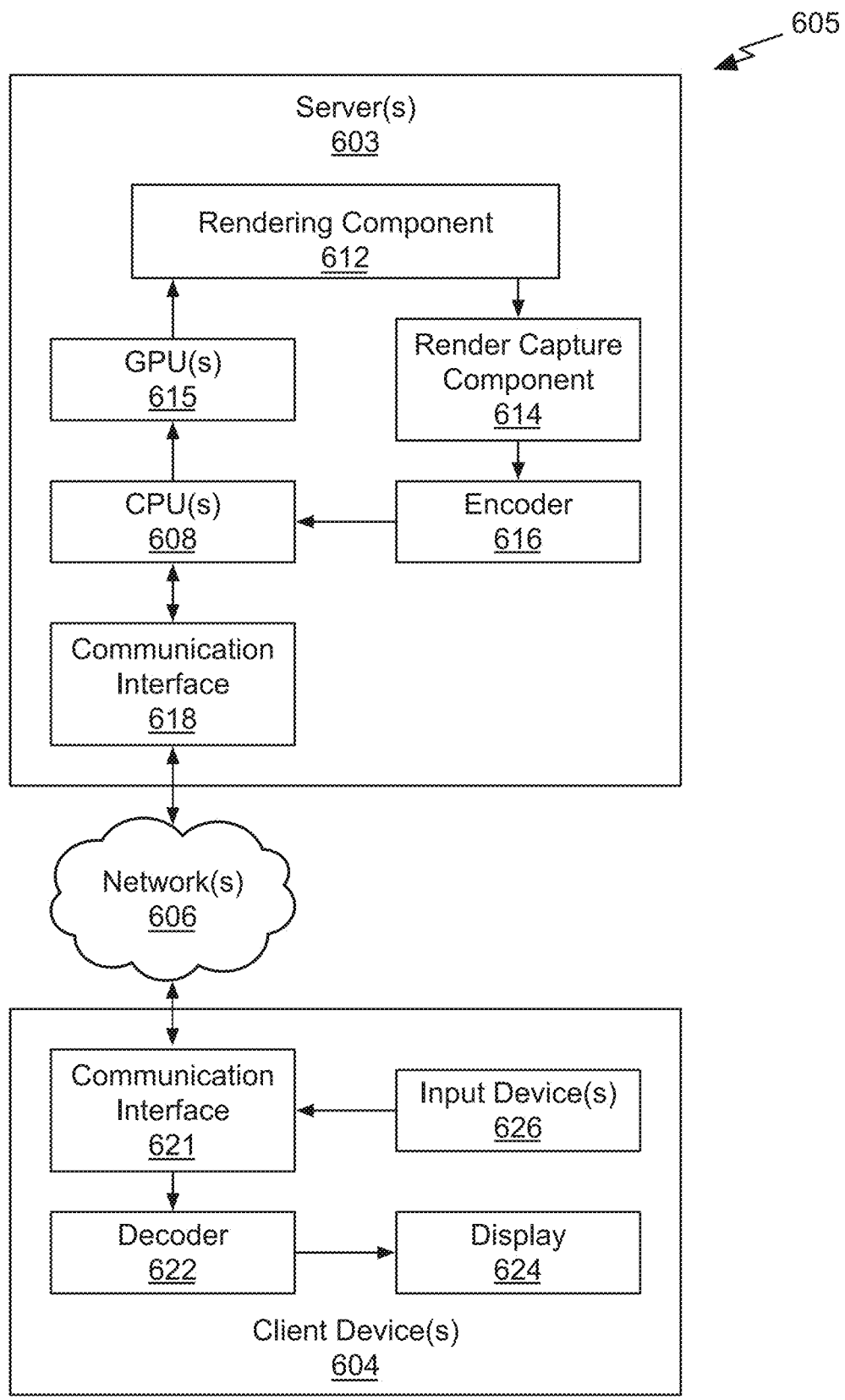
FIG. 6 illustrates an exemplary streaming system suitable for use in implementing some embodiments of the present disclosure.

FIG. 6B is an example system diagram for a streaming system 605, in accordance with some embodiments of the present disclosure. FIG. 6B includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the sever(s) 604 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B")

is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
processing, by a neural network radiance cache model, a three-dimensional (3D) position associated with a light transport path through a scene to produce a radiance prediction at the 3D position;
generating an image of the scene corresponding to at least one camera using the radiance prediction;
generating an extended light transport path ending at a terminal 3D position;
processing the terminal 3D position to produce a second radiance prediction at the terminal 3D position; and
updating weights of the neural network radiance cache model based on the second radiance prediction.

2. The computer-implemented method of claim 1, wherein the extended light transport path is generated by extending the light transport path from the 3D position.

3. The computer-implemented method of claim 2, wherein the updated weights are also updated based on the second radiance prediction propagated to the 3D position.

4. The computer-implemented method of claim 1, wherein the extended light transport path does not include the 3D position.

5. The computer-implemented method of claim 1, wherein the terminal 3D position is processed by the neural network radiance cache model to produce the second radiance prediction.

6. The computer-implemented method of claim 1, wherein the light transport path terminates at the 3D position based on a first size of a first footprint of the light transport path at the 3D position compared with a second size of a second footprint of the light transport path at a visible 3D position.

7. The computer-implemented method of claim 6, wherein the extended light transport path terminates at the terminal 3D position based on a third size of a third footprint of the extended light transport path at the terminal 3D position compared with the second size.

8. The computer-implemented method of claim 1, wherein the neural network radiance cache model also processes an additional input that is at least one of a material property, view direction, or normal vector associated with the 3D position to produce the radiance prediction.

9. The computer-implemented method of claim 8, wherein, prior to processing the 3D position and the additional input, the 3D position and the additional input are encoded into a higher-dimensional space.

10. The computer-implemented method of claim 1, wherein a filtered copy of the weights is used to generate the radiance prediction at the 3D position.

11. The computer-implemented method of claim 10, wherein updating the weights produces a sequence of weight updates and the filter is a moving average over the sequence of weight updates.

12. The computer-implemented method of claim 1, wherein the light transport path and additional light transport paths are traced to produce one light transport path for each pixel of the image, and further comprising selecting a subset including the additional light transport paths and extending each additional light transport path in the subset to produce additional extended light transport paths.

13. The computer-implemented method of claim 12, wherein the subset is chosen according to at least one of a uniform and a non-uniform distribution.

14. The computer-implemented method of claim 1, further comprising:
processing, by the neural network radiance cache model, a second 3D position associated with a second light transport path through the scene according to the updated weights to produce a second radiance prediction at the second 3D position; and
generating a second image of the scene using the second radiance prediction.

15. The computer-implemented method of claim 14, wherein at least one of the camera, lighting, geometry, and materials is changed for the second light transport path compared with the light transport path.

16. The computer-implemented method of claim 1, wherein the radiance prediction is multiplied by at least one of diffuse reflectance, specular reflectance, a normal vector, roughness, albedo, bidirectional reflectance distribution function (BRDF), and a phase function of a material property associated with the 3D position.

17. The computer-implemented method of claim 1, wherein a second 3D position at which a second radiance prediction is produced is importance sampled based on the 3D position.

18. The computer-implemented method of claim 1, wherein the radiance prediction comprises only ambient occlusion.

19. The computer-implemented method of claim 1, wherein the neural network radiance cache model processes additional 3D positions associated with additional light transport paths from additional cameras.

20. The computer-implemented method of claim 1, wherein the 3D position is generated by at least one of a rasterizer, a ray tracer, a ray marcher, a sphere tracer, and a cone tracer.

21. The computer-implemented method of claim 1, wherein the 3D position is parameterized by 2D surface coordinates.

22. The computer-implemented method of claim 1, wherein the neural network radiance cache model is trained on a server or in a data center and the image is streamed to a user device.

23. The computer-implemented method of claim 1, wherein the neural network radiance cache model is trained on a server or in a data center and is streamed to a user device.

24. The computer-implemented method of claim 1, wherein one or more of the steps of processing the 3D position, generating the image, generating the extended light transport path, processing the terminal 3D position, and updating are performed within a cloud computing environment.

25. The computer-implemented method of claim 1, wherein one or more of the steps of processing the 3D position, generating the image, generating the extended light transport path, processing the terminal 3D position, and updating are performed on a server or in a data center and the image is streamed to a user device.

26. The computer-implemented method of claim 1, wherein one or more of the steps of processing the 3D position, generating the image, generating the extended light transport path, processing the terminal 3D position, and updating are performed on a server or in a data center and the neural network radiance cache is streamed to a user device.

27. The computer-implemented method of claim 1, wherein the generated image is used for training, testing, or certifying a neural network employed in a machine, robot, or autonomous vehicle.

28. The computer-implemented method of claim 1, wherein one or more of the steps of processing the 3D position, generating the image, generating the extended light transport path, processing the terminal 3D position, and updating are performed on a virtual machine comprising a portion of a graphics processing unit.

29. A system, comprising:
a memory storing data for a scene;
a processor that is connected to the memory and configured to generate images of the scene by:
  processing, by a neural network radiance cache model, a three-dimensional (3D) position associated with a light transport path through a scene to produce a radiance prediction at the 3D position;
  generating an image of the scene corresponding to at least one camera using the radiance prediction;
  generating an extended light transport path ending at a terminal 3D position;
  processing the terminal 3D position to produce a second radiance prediction at the terminal 3D position; and
  updating weights of the neural network radiance cache model based on the second radiance prediction.

30. The system of claim 29, further comprising terminating the light transport path at the 3D position based on a first size of a first footprint of the light transport path at the 3D position compared with a second size of a second footprint of the light transport path at a visible 3D position.

31. The system of claim 29, wherein the neural network radiance cache model also processes an additional input that is at least one of a material property, view direction, or normal vector associated with the 3D position to produce the radiance prediction.

32. The system of claim 29, wherein a filtered copy of the weights is used to generate the radiance prediction at the 3D position.

33. The system of claim 29, the processing comprises
partitioning the 3D position and additional 3D positions into portions that are each sized for execution in a processing core by a single thread block; and
independently processing the portions in parallel by a set of processing cores within the processor, wherein the weights are applied to each of the portions to produce the radiance prediction at the 3D position and additional radiance predictions at the additional 3D positions.

34. A non-transitory computer-readable media storing computer instructions that, when executed by one or more processors, cause the one or more processors to perform the steps of:
processing, by a neural network radiance cache model, a three-dimensional (3D) position associated with a light transport path through a scene to produce a radiance prediction at the 3D position;
generating an image of the scene corresponding to at least one camera using the radiance prediction;
generating an extended light transport path ending at a terminal 3D position;
processing the terminal 3D position to produce a second reflected radiance at the terminal 3D position; and
updating weights of the neural network radiance cache model based on the second radiance prediction.

35. The non-transitory computer-readable media of claim 34, wherein the light transport path terminates at the 3D position based on a first size of a first footprint of the light transport path at the 3D position compared with a second size of a second footprint of the light transport path at a visible 3D position.

* * * * *